(12) United States Patent
Bonnes et al.

(10) Patent No.: US 11,697,443 B2
(45) Date of Patent: Jul. 11, 2023

(54) APPARATUS FOR LOCATING A MOBILE RAILWAY ASSET

(71) Applicant: Amsted Rail Company, Inc., Chicago, IL (US)

(72) Inventors: Matthew Bonnes, Malvern, PA (US); Thomas J. Sollenberger, Collegeville, PA (US); Francis James Cooper, Downingtown, PA (US)

(73) Assignee: Amsted Rail Company, Inc., Chicago, IL (US)

( * ) Notice: Subject to any disclaimer, the term of this patent is extended or adjusted under 35 U.S.C. 154(b) by 388 days.

(21) Appl. No.: 16/868,523

(22) Filed: May 6, 2020

(65) Prior Publication Data

US 2020/0353961 A1 Nov. 12, 2020

Related U.S. Application Data

(60) Provisional application No. 62/845,098, filed on May 8, 2019.

(51) Int. Cl.
*B61L 25/02* (2006.01)
*B61L 15/00* (2006.01)
(Continued)

(52) U.S. Cl.
CPC ......... *B61L 25/025* (2013.01); *B61L 15/0018* (2013.01); *B61L 15/0027* (2013.01);
(Continued)

(58) Field of Classification Search
CPC ............... B61L 25/025; B61L 15/0018; B61L 15/0027; B61L 27/70; B61L 2205/04;
(Continued)

(56) References Cited

U.S. PATENT DOCUMENTS 5,554,994 A 9/1996 Schneider
6,339,397 B1 1/2002 Baker
(Continued)

FOREIGN PATENT DOCUMENTS

EP 1922236 B1 10/2014
WO 2005095174 A1 10/2005
(Continued)

OTHER PUBLICATIONS

Invitation to Pay Additional Fees from International Patent Application No. PCT/US2020/031843 dated Jun. 26, 2020; 2 pages.
(Continued)

*Primary Examiner* — Zachary L Kuhfuss
(74) *Attorney, Agent, or Firm* — Fitch, Even, Tabin & Flannery LLP

(57) ABSTRACT

In one aspect of the present disclosure, an apparatus for locating a mobile railway asset is provided that includes a power source, GNSS circuitry configured to utilize electrical power from the power source to receive GNSS data, and a controller operatively coupled to the power source and the GNSS circuitry. The controller has a power saving mode wherein the controller inhibits the GNSS circuitry from receiving GNSS data and a standard accuracy mode wherein the controller permits the GNSS circuitry to receive GNSS data for a first time period. The controller has a higher accuracy mode wherein the controller permits the GNSS circuitry to receive GNSS data for a second time period longer than the first time period, and subsequently across multiple instances, in order to collect more GNSS data that can be qualified, filtered, sorted, and averaged to produce a more accurate result.

60 Claims, 11 Drawing Sheets

(51) Int. Cl.
| | |
|---|---|
| *H04W 52/02* | (2009.01) |
| *H04W 4/42* | (2018.01) |
| *G01S 19/50* | (2010.01) |
| *B61L 27/70* | (2022.01) |
| *G01S 19/14* | (2010.01) |
| *G01S 19/34* | (2010.01) |
| *G01S 5/00* | (2006.01) |
| *G01S 19/39* | (2010.01) |
| *G01S 19/07* | (2010.01) |
| *G01S 19/42* | (2010.01) |

(52) U.S. Cl.
CPC ............. *B61L 27/70* (2022.01); *G01S 5/01* (2020.05); *G01S 5/017* (2020.05); *G01S 19/14* (2013.01); *G01S 19/34* (2013.01); *G01S 19/50* (2013.01); *H04W 4/42* (2018.02); *H04W 52/0274* (2013.01); *B61L 2205/04* (2013.01); *G01S 19/071* (2019.08); *G01S 19/396* (2019.08); *G01S 19/426* (2013.01); *Y02D 30/70* (2020.08)

(58) Field of Classification Search
CPC . G01S 5/01; G01S 5/017; G01S 19/14; G01S 19/34; G01S 19/50; G01S 19/071; G01S 19/396; G01S 19/426; H04W 4/42; H04W 52/0274; Y02D 30/70
See application file for complete search history.

(56) References Cited

U.S. PATENT DOCUMENTS

| | | | |
|---|---|---|---|
| 7,135,976 | B2 | 11/2006 | Neff |
| 7,688,218 | B2 | 3/2010 | LeFebvre |
| 7,698,962 | B2 | 4/2010 | LeFebvre |
| 7,825,803 | B2 | 11/2010 | Neff |
| 8,212,685 | B2 | 7/2012 | LeFebvre |
| 8,823,537 | B2 | 9/2014 | LeFebvre |
| 9,026,281 | B2 | 5/2015 | Murphy |
| 9,365,223 | B2 | 6/2016 | Martin |
| 9,663,092 | B2 | 5/2017 | Martin |
| 9,663,124 | B2 | 5/2017 | LeFebvre |
| 9,981,673 | B2 | 5/2018 | Martin |
| 10,137,915 | B2 | 11/2018 | LeFebvre |
| 10,259,477 | B2 * | 4/2019 | LeFebvre ................ B61L 27/50 |
| 10,710,619 | B2 * | 7/2020 | LeFebvre ............... B61L 25/025 |
| 2010/0288157 | A1 | 11/2010 | LeFebvre |
| 2013/0342362 | A1 | 12/2013 | Martin |
| 2014/0060979 | A1 | 3/2014 | Martin |
| 2014/0111356 | A1 | 4/2014 | LeFebvre |
| 2015/0123847 | A1 | 5/2015 | Farmer |
| 2015/0219487 | A1 | 8/2015 | Maraini |
| 2016/0152252 | A1 | 6/2016 | Kim |
| 2016/0272228 | A1 | 9/2016 | LeFebvre |
| 2016/0325767 | A1 | 11/2016 | LeFebvre |
| 2017/0021847 | A1 * | 1/2017 | LeFebvre ................ B61L 27/40 |
| 2017/0199101 | A1 * | 7/2017 | Franchitti ........... B61L 15/0027 |
| 2017/0282944 | A1 * | 10/2017 | Carlson ................. G01S 19/17 |
| 2018/0319414 | A1 | 11/2018 | LeFebvre |
| 2019/0225248 | A1 | 7/2019 | Lidgett |
| 2019/0235088 | A1 | 8/2019 | Tanaka |
| 2019/0250069 | A1 | 8/2019 | Samadani |
| 2019/0319835 | A1 | 10/2019 | Mansfield |
| 2020/0023870 | A1 | 1/2020 | Mansfield |
| 2020/0079343 | A1 | 3/2020 | Martin |

FOREIGN PATENT DOCUMENTS

| | | |
|---|---|---|
| WO | 2015069510 A2 | 5/2015 |
| WO | 2016191711 | 12/2016 |
| WO | 2018113858 A1 | 6/2018 |

OTHER PUBLICATIONS

U.S. Appl. No. 62/889,803, filed Aug. 21, 2019; 63 pages.
Telit Communications S.p.A.: Using SiRF Star IV with an External Host Application Note; 80000NT10057a Rev.0; Nov. 10, 2011; 19 pages.
Telit Communications S.p.A.: SE873 Product User Guide; 1VV0301216 r1; Sep. 5, 2015; 68 pages.
PCT Search Report and Written Opinion from corresponding International Patent Application No. PCT/US2020/031843; dated Aug. 31, 2020; 24 pages.
Communication Pursuant to Rule 164(1) EPC from related European Patent Application No. 20803044.5 dated Apr. 12, 2023; 15 pages.

* cited by examiner

APPARATUS FOR LOCATING A MOBILE RAILWAY ASSET

CROSS-REFERENCE TO RELATED APPLICATION

This application claims the benefit of U.S. Provisional Patent Application No. 62/845,098, filed May 8, 2019, which is hereby incorporated by reference in its entirety.

FIELD

This disclosure relates to global navigation satellite system (GNSS)-enabled devices having limited powered sources and, more specifically, to GNSS-enabled devices for use with mobile railway assets. Mobile railway assets may include, for example, locomotives, railcars, containers, and/or rail maintenance equipment.

BACKGROUND

Each satellite of a GNSS constellation periodically transmits a signal containing GNSS data including ephemeris data and timing data for all of the satellites of the GNSS constellation. The GNSS satellites each have a time slot to transmit their information. It may take around 10-12 seconds for all the satellites of a GNSS constellation to broadcast their GNSS data. The ephemeris data includes the position of the satellites of the GNSS constellation and orbital characteristics of the satellites. A GNSS-enabled device has a GNSS receiver, such as a chipset, that receives the GNSS data from GNSS satellites visible to the GNSS-enabled device. The GNSS receiver uses the GNSS data and the time the GNSS receiver received the GNSS data from the visible GNSS satellites to calculate a position of the chipset on earth.

Conventional GNSS-enabled devices that are designed to be used in rail applications often have limited accuracy due to the power constraints placed on GNSS operation in order to preserve the power source of the device. These power sources may include a primary battery, which is not rechargeable, or a rechargeable battery. Another type of power source used in some GNSS-enabled devices includes a super-capacitor in conjunction with a battery and/or an energy harvesting mechanism that generates electrical energy from the movement of the mobile railway asset.

The limited accuracy provided by conventional GNSS-enabled devices is due to the power demands of a GNSS receiver of the device. More specifically, the GNSS receiver of a battery powered GNSS-enabled device typically consumes a large amount of power when collecting and processing GNSS data, which includes ephemeris data and timing data (e.g. clock pulses), from orbiting satellites of a GNSS constellation to determine the location of the device on Earth. The ephemeris data may contain satellite accuracy and health information, clock correction coefficients, and/or orbital parameters to determine the precise location of each satellite in orbit. Each satellite transmits this data on a periodic interval, so that GNSS receivers can have up-to-date data for the satellites used for calculating location.

Collecting ephemeris data and timing data from the satellites requires power. As such, any time when the GNSS receiver is powered, the GNSS receiver decreases the amount of energy stored in the battery of the GNSS-enabled device. And, the less frequently the GNSS receiver is energized or powered, the less accurate the determined location will be, because there may be fewer satellites available in the sky from which to collect ephemeris data and the accuracy of ephemeris data may decay. Therefore, a balance must be struck between the energy consumed by the GNSS-enabled device and the accuracy of the GNSS location data determined by the device.

One prior approach involves operating a GNSS receiver of a battery powered GNSS-enabled device mounted to a railcar according to a predetermined schedule. The relatively infrequent operation of the GNSS receiver called for by the schedule may be sufficient for determining railcar location when the railcar is traveling along a railroad track. The GNSS-enabled device has an accelerometer to detect a sudden change of speed of the railcar, such as the railcar coming to rest in a rail yard. The GNSS-enabled device operates the GNSS receiver in response to the sudden change of speed to determine the railcar location. This prior approach thereby balanced battery consumption and accuracy by operating the GNSS receiver infrequently when precise railcar location information was not required and operating the GNSS receiver more frequently when an external event, e.g., coming to rest in a rail yard, indicates more accurate location information may be desired.

SUMMARY

In accordance with one aspect of the present disclosure, an apparatus is provided for locating a mobile railway asset. The apparatus includes a limited power source and global navigation satellite system (GNSS) circuitry configured to utilize electrical power from the power source to receive GNSS data from satellites of a GNSS constellation. The GNSS data includes ephemeris data representative of the satellites in space and timing data from the satellites. The term satellite or GNSS satellite as used herein is intended to refer to a satellite of a GNSS constellation. The satellite(s) may provide functionality in addition to providing GNSS data, such as detecting a nuclear detonation.

The apparatus also includes a controller operatively coupled to the limited power source and the GNSS circuitry. The controller has a power saving mode wherein the controller inhibits the GNSS circuitry from receiving GNSS data and a standard accuracy mode wherein the controller permits the GNSS circuitry to receive GNSS data for a first time period. The controller also has a higher accuracy mode wherein the controller permits the GNSS circuitry to receive GNSS data for a second time period longer than the first time period. The controller is configured to enter the higher accuracy mode and permit the GNSS circuitry to receive GNSS data for the second time period in response to a determination of a mobile railway asset event. The apparatus further includes communication circuitry operatively coupled to the controller and configured to communicate data indicative of a location of the mobile railway asset based at least in part on the GNSS data received during the longer second time period. It has been discovered that the accuracy of received GNSS data generally increases when the receiver is active long enough to receive updated GNSS data containing the most up-to-date positional accuracy data from each satellite. Because the GNSS circuitry can operate for the longer second time period, the GNSS circuitry utilizes more visible satellites in the constellation with more precise GNSS data, which permits a more accurate determination of the location of the mobile railway asset. This ability to operate in the standard accuracy mode and the higher accuracy mode permits less stored energy from the power source to be used in the standard accuracy mode when a less accurate location determination is required, such as when the mobile railway asset is in transit, and more stored energy to be used in the higher accuracy mode when a more accurate location determination is required, such as when the mobile railway asset is in a rail yard.

The controller may perform operations on the received GNSS data to improve accuracy. For example, when a mobile railway asset associated with the apparatus is known to be stationary, multiple location calculations may be performed using GNSS data received during separate periods of time and averaged together to provide a more accurate resolution of position because many different satellites would be used, at different elevations and angles.

In another aspect, a system is provided including a mobile railway asset, a limited power source, and global navigation satellite system (GNSS) circuitry configured to utilize electrical power from the power source to receive GNSS data from satellites of a GNSS constellation. The mobile railway asset may be, for example, a locomotive, a railcar, a rail maintenance vehicle, a container(s), and/or a crane. The system includes a controller having a power saving mode wherein the controller inhibits the GNSS circuitry from receiving GNSS data and a standard accuracy mode wherein the controller permits the GNSS circuitry to receive GNSS data for a first time period. The controller further has a higher accuracy mode wherein the controller permits the GNSS circuitry to receive GNSS data for a second time period longer than the first time period. The controller is configured to enter the higher accuracy mode and permit the GNSS circuitry to receive GNSS data for the second time period in response to a determination of a mobile railway asset event. The system includes communication circuitry operatively coupled to the controller and configured to communicate data indicative of a location of the mobile railway asset based at least in part on the GNSS data received during the second time period. The standard accuracy mode may be utilized to provide periodic updates of the location of the mobile railway asset according to a set schedule or particular events. The higher accuracy mode may be utilized only sporadically when a higher accuracy location determination is required. The controller thereby balances preserving stored energy of the power source by using the standard accuracy mode for less-critical location determinations while consuming more stored energy as needed for higher location accuracy in the higher accuracy mode.

The present disclosure also provides a method of operating a sensing apparatus for a mobile railway asset. The method includes, at the sensing apparatus, inhibiting global navigation satellite system (GNSS) circuitry of the sensing apparatus from receiving GNSS data from satellites of a GNSS to conserve stored energy of a limited power source of the apparatus. The method includes permitting the GNSS circuitry to receive GNSS data for a first time period and wirelessly transmitting data indicative of a location of the mobile railway asset based at least in part on the GNSS data received during the first time period. The method further includes in response to a determination of a mobile railway asset event, permitting the GNSS circuitry to receive GNSS data for a second time period longer than the first time period. The method further includes wirelessly transmitting data indicative of a location of the mobile railway asset based at least in part on the GNSS data received during the second time period from communication circuitry of the sensory apparatus. In this manner, the method permits a more accurate determination of the mobile railway asset location using the GNSS data received during the longer second time period and in response to a determination of a mobile railway asset event. The longer second time period permits the GNSS circuitry to obtain more GNSS data, and potentially from a greater number of visible satellites, than the first time period, which results in more accurate location determination for the mobile railway asset.

In another aspect of the present disclosure, a stationary gateway is provided for facilitating monitoring of the location of a mobile railway asset in a railway connected facility. The railway connected facility may be, for example, a rail yard of a railroad, a rail yard of a production company, or a train station. The stationary gateway includes a GNSS receiver configured to receive GNSS data from satellites of a GNSS and a communication interface operable to communicate with a GNSS-enabled device of a mobile railway asset, the communication interface configured to facilitate communication between the GNSS-enabled device and a remote computer over a network. The stationary gateway further includes a processor operably coupled to the GNSS receiver and the communication interface. The processor is configured to perform a self-survey using the GNSS data from the GNSS receiver and determine a self-surveyed location of the stationary gateway.

In one embodiment, the self-survey involves the processor calculating multiple location fixes for the stationary gateway over an extended period, such as greater than 24 hours, using data from all or a substantial portion of the satellites of a GNSS. A location fix generally includes a latitude, longitude, altitude, and time coordinate of the GNSS receiver. The processor performs an averaging algorithm on the multiple location fixes to accurately determine a self-surveyed location of the stationary gateway.

The processor is further configured to determine a current location of the stationary gateway using current GNSS data received by the GNSS receiver wherein the current location of the stationary gateway is determined with less accuracy than the self-surveyed location. The current location determination is less accurate than the self-surveyed location due at least in part to the shorter time period for gathering location data from satellites of the GNSS to determine the current location than the self-surveyed location.

The processor is configured to determine current location error data by comparing the current location of the stationary gateway to the self-surveyed location of the stationary gateway. Still further, the processor of the stationary gateway is configured to communicate the current location error data to the GNSS-enabled device to facilitate the GNSS-enabled device determining a location of the mobile railway asset based at least in part on current location error data from the stationary gateway. In this manner, the location of the mobile railway asset may be determined in a highly accurate manner using error data from the stationary gateway rather than relying solely on the GNSS data received by the GNSS-enabled device. This permits the GNSS-enabled device to operate the GNSS circuitry thereof for shorter periods of time and preserve the limited power source of the GNSS-enabled device.

The disclosure also provides an apparatus for monitoring the location of a mobile railway asset. The apparatus includes a limited power source and GNSS circuitry configured to utilize electrical power from the limited power source to receive GNSS data from the satellites of a GNSS. The apparatus further includes communication circuitry configured to wirelessly receive current location error data from a stationary gateway. The current location error data is determined by comparing current location data of the stationary gateway to a self-surveyed location of the stationary gateway. The apparatus also includes a controller operatively connected to the GNSS circuitry and the communication circuitry. The controller has a power saving mode wherein the controller inhibits the GNSS circuitry from receiving GNSS data and a location mode wherein the controller permits the GNSS circuitry to receive GNSS data. The controller is configured to determine a location of the mobile railway asset based at last in part on the received GNSS data and the current location error data from the stationary gateway. The controller may thereby determine a location of the mobile railway asset with high accuracy while minimizing power consumption associated with operation of the GNSS circuitry.

Figure 1A:
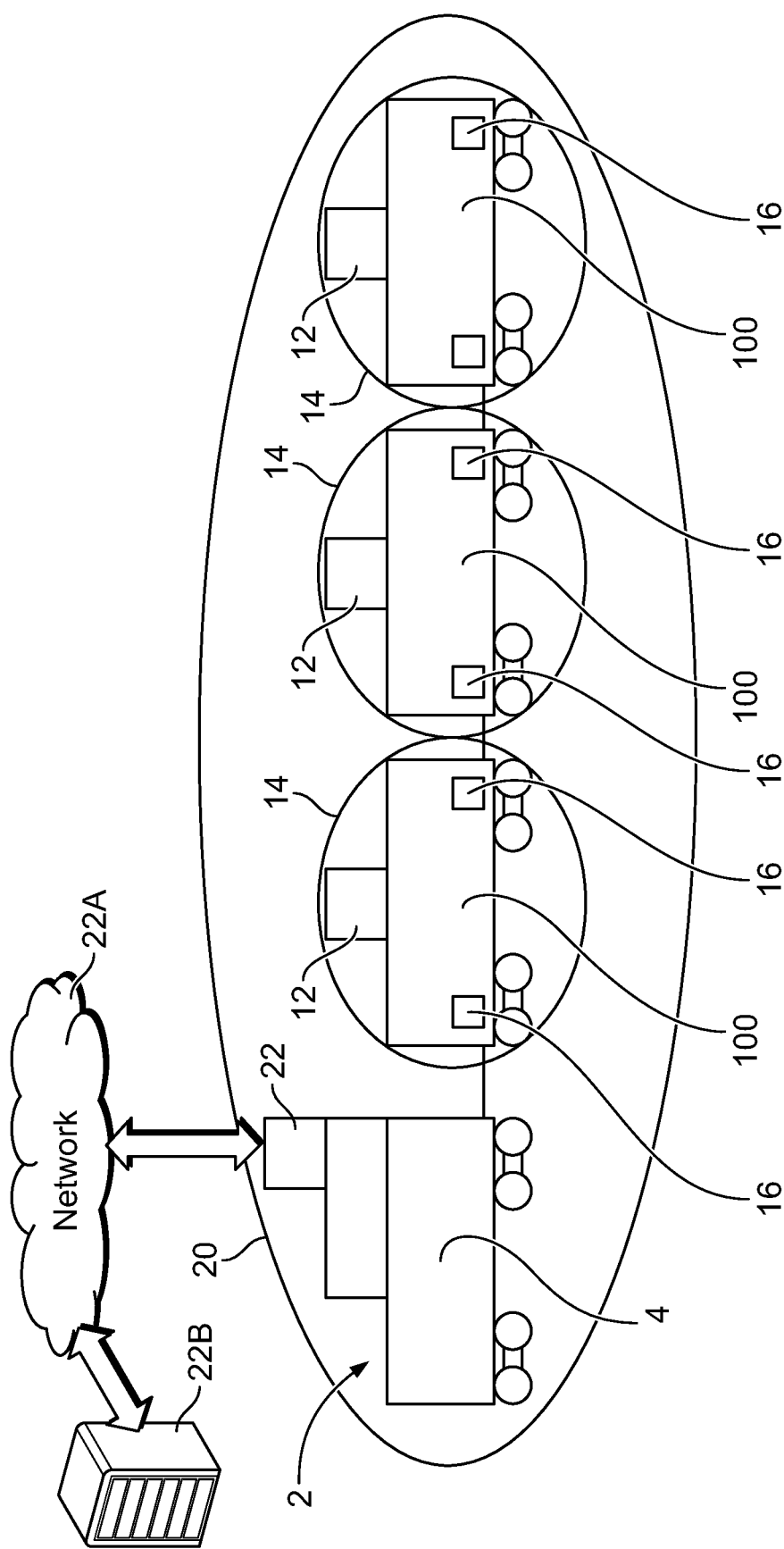
FIG. 1A is a schematic view of a train consist including a locomotive having a powered wireless gateway and mobile railway assets having communication management units such as GNSS-enabled devices and wireless sensor nodes.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted to facilitate a less obstructed view of these various embodiments. It will further be appreciated that certain actions and/or steps may be described or depicted in a particular order of occurrence while those skilled in the art will understand that such specificity with respect to sequence is not actually required.

It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

In one aspect of the present disclosure, a GNSS-enabled device is disclosed that provides improved location accuracy while utilizing a limited power source. The GNSS-enabled device includes GNSS circuitry configured to utilize electrical power from the limited power source of the device and receive location data from one or more satellite systems orbiting the earth. The satellite systems may include, for example, the Galileo, Beidou, GLONASS, or GPS satellite constellations.

The GNSS-enabled device includes a controller operatively coupled to the limited power source, which may be but is not limited to a non-rechargeable battery, and the GNSS circuitry. The controller is configured to, among other operations, manage the on-time of the GNSS circuitry and preserve the stored energy of the limited power source. The controller may include, for example, a general-purpose processor, or a specifically designed application specific integrated circuit (ASIC). The controller may be operatively coupled to one or more sensors, which may be integral with the GNSS-enabled device or operably coupled thereto via wired or wireless approaches. The one or more sensors may be configured for sensing one or more parameters of a mobile railway asset such as but not limited to a mobile railway asset. The controller may also be operatively coupled to communication circuitry for communicating data via one or more long-range wireless protocols and/or via one or more short-range wireless communication protocols. The communication circuitry and the one or more sensors may be wholly contained in the GNSS-enabled device. In another embodiment, the one or more sensors may interface with the device via one or more ports or wireless communication protocols.

The controller has different modes that achieve different objectives for the GNSS-enabled device. The controller has a power saving mode wherein the controller inhibits the GNSS circuitry from receiving location data from satellites. The controller also has a standard accuracy mode wherein the controller permits the GNSS circuitry to receive location data for a first time period. The controller may reconfigure from the power saving mode to the standard accuracy mode according to one or more criteria. For example, the controller may reconfigure from the power saving mode to the standard accuracy mode according to a fixed or variable schedule. As another example, the controller may apply a first heuristic to the GNSS data and/or data from one or more sensors to determine if a change in a mobile railway asset parameter has occurred and reconfigure the controller from the power saving mode to the standard accuracy mode.

Further, the controller has a higher accuracy mode wherein the controller permits the GNSS circuitry to receive location data for a second time period longer than the first time period. The controller may reconfigure from the standard accuracy mode to the higher accuracy mode, or from the power saving mode to the higher accuracy mode, in response to a determination of a mobile railway asset event. For example, the controller may apply a second heuristic to the GNSS data and/or data from one or more sensors to determine if a change in a mobile railway asset parameter has occurred and reconfigure the controller from the power saving mode or standard accuracy mode to the higher accuracy mode.

The controller may have a default power mode, such as the power saving mode which the controller reverts to after a higher-energy consumption power mode such as the standard accuracy mode or the higher accuracy mode. In the power saving mode, the controller may inhibit the GNSS circuitry from receiving location data by, for example, turning off the GNSS circuitry or by disabling the reception of GNSS data. This preserves the life of the power source by minimizing energy usage of the GNSS circuitry. As an example, the power saving mode may involve the controller placing the GNSS circuitry in a trickle or hibernate mode wherein the controller provides the minimum amount of electrical energy to the GNSS circuitry required to maintain previously-received ephemeris data that is stored in a memory of the GNSS circuitry. The trickle or hibernate mode may involve the controller providing a de minimis amount of energy, such as 5 mA, to the GNSS circuitry. Providing a de minimis amount of energy to maintain the ephemeris data in the memory of the GNSS circuitry in the hibernate mode of the controller avoids the GNSS circuitry going through a startup sequence that may be undesirably long and consume an undesirable amount of electrical energy for certain situations. In the startup sequence, the GNSS may have to receive GNSS data for a time period sufficient to gather enough GNSS data, including current ephemeris data, to calculate a location fix of the GNSS circuitry. By providing the de minimis amount of energy to the GNSS circuitry, the ephemeris data is kept in the memory of the GNSS circuitry and the startup sequence is avoided. The ephemeris data for the GNSS satellites changes relatively slowly, such as over several hours, which permits the ephemeris data stored in the memory of the GNSS circuitry operating in hibernate mode to be sufficiently accurate to utilize in location calculations. However, in some embodiments the power saving mode may involve turning off power to the GNSS circuitry where the startup sequence consumes an acceptable amount of electrical energy.

In one embodiment, the controller reconfiguring from the power saving mode to the standard accuracy mode may include the controller sending a control signal to the GNSS circuitry that toggles the GNSS circuitry from hibernate to a powered state wherein a receiver of the GNSS circuitry receives GNSS data from GNSS satellites. Conversely, the controller reconfiguring from the standard accuracy mode to the power saving mode may include the controller sending a control signal to the GNSS circuitry that causes the GNSS circuitry to hibernate and de-energize the receiver of the GNSS circuitry.

In the standard accuracy mode, the controller permits the GNSS circuitry to receive GNSS data for a first time period. The controller may provide electrical power to the GNSS circuitry greater than the de minimis amount provided in the power saving mode, such as 25 mA. The first time period may be fixed or variable. The variable period of time may be the period of time required for the controller and/or GNSS circuitry to achieve a threshold location accuracy for the GNSS-enabled device. For example, the first time period may be the time required to receive GNSS data including timing data from a minimum of four satellites with valid ephemeris data. The time it takes to acquire data from these satellites may vary, but the expectation is typically this will occur between, for example, five and forty seconds depending on the length of time between the previous acquisition and the environment. As another example, the first time period may be the time required to receive enough GNSS data to calculate a predetermined number of valid location fixes. The GNSS circuitry may calculate a location fix every second that the GNSS circuitry is operating in standard accuracy mode.

The controller may utilize the standard accuracy mode to obtain GNSS data when the accuracy of the location of the mobile railway asset is not as critical, such as when the mobile railway asset is in transit. The controller may also utilize the standard accuracy mode for updates of the location of the mobile railway asset according to a predetermined schedule. The controller may have a timer to monitor the length of the first time period and return to the power saving mode if the threshold location accuracy is not achieved, such as forty-five seconds, sixty seconds, or ninety seconds. The threshold location accuracy may not be achieved, for example, if the GNSS satellite signals are blocked by terrain or a mobile railway asset on an adjacent track.

In the higher accuracy mode, the controller permits the GNSS circuitry to receive GNSS data for a second time period that is longer than the first time period of the standard accuracy mode. By permitting GNSS circuitry to receive newly updated GNSS data, which will be more precise, and acquiring data for a longer time period, more GNSS data can be received and potentially from a greater number of visible satellites in a GNSS. The more precise GNSS data, which includes ephemeris data and timing data, from many visible GNSS satellites provides more information for use in calculating the location of the mobile railway asset which, in turn, permits a more accurate calculation of the location.

The controller may also filter the GNSS data received during the second time period. For example, if the second time period is forty seconds the controller may discard the location fixes of the first thirty seconds and keep the location fixes for the last ten seconds. The controller may then average the location fixes of the last eight to ten seconds to determine the location of the GNSS-enabled device.

The controller may utilize the higher accuracy mode according to a predetermined or random schedule to supplement location estimates made using GNSS data from the standard accuracy mode. Alternatively or in addition, the controller may utilize the higher accuracy mode in response to a determination of a mobile railway asset event such as the mobile railway asset entering a geofenced rail yard or receiving data from a sensor mounted, for example, on the hatch of a railcar.

The second time period may be fixed or variable. A fixed second time period may be, for example, in the range of 35 seconds to 60 seconds such as 40 seconds. A variable second period of time may be the period of time required for the controller and/or GNSS circuitry to achieve a threshold location accuracy for the GNSS-enabled device. The threshold may be higher than the threshold utilized for the first period of time, such as the GNSS receiver receiving GNSS data from six satellites in the second time period rather than four satellites in the first time period. The controller may have a timer to monitor the length of the second time period and return to the power saving mode if the threshold location accuracy of the higher accuracy mode is not achieved, such as two minutes.

Figure 5:
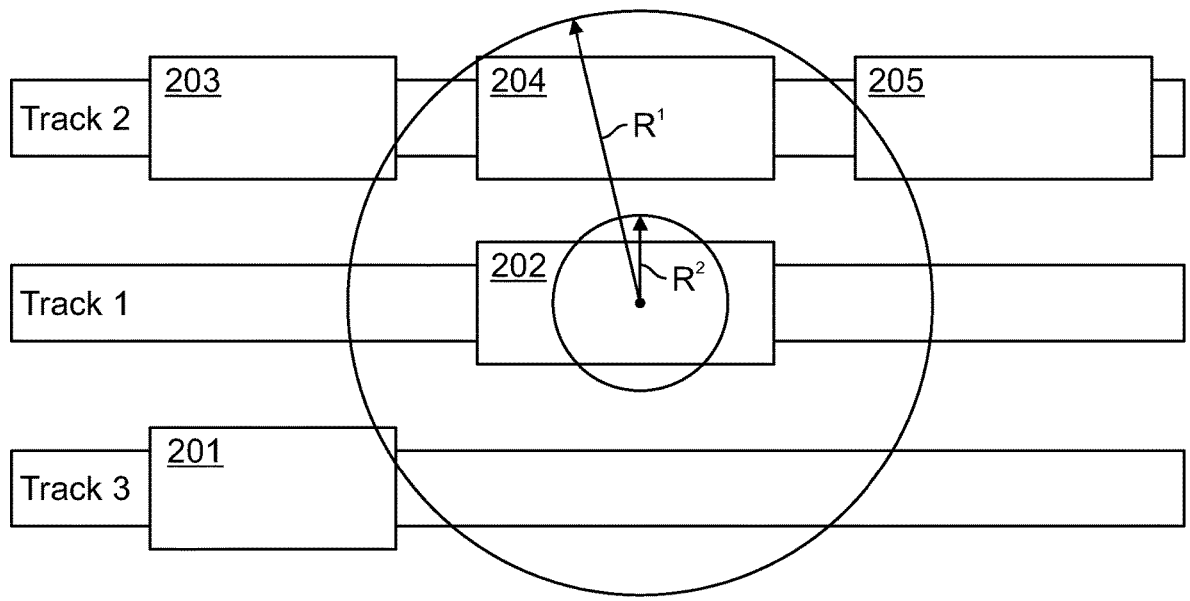
FIG. 5 is a comparison of the GNSS location accuracy provided by the GNSS-enabled device of FIG. 2 in a standard accuracy mode ($R^1$) and a higher accuracy mode ($R^2$)

With reference to FIG. 5, the GNSS data received during the first time period of the standard accuracy mode may provide a range of calculated locations of the mobile railway asset 202 within the radius $R^1$. The calculated locations may be on track 1, track 2, or track 3 of a rail yard, and the calculated locations may actually be on the railcars 201, 203,

204, 205. This level of accuracy may be acceptable if it is sufficient to know that the railcar is in the rail yard. However, this level of accuracy may not be acceptable for determining which track the mobile railway asset 202 is on, such as when assembling a train consist according to a train manifest. By contrast, the GNSS data received during the second time period of the higher accuracy mode may be analyzed to provide a range of calculated locations of the railcar 202 within radius $R^2$. The tighter range of locations of the railcar 202 permits the railcar 202 to be identified as being on track 1 of the rail yard.

In one embodiment, the data collected in the second time period associated with the higher accuracy mode may be post-processed by sorting each reading received during the second time period based on a measure of accuracy to form sorted location data of varying accuracy (accuracy may be based on metrics such as horizontal dilution of precision (HDOP) and/or satellite count); discarding a portion of the sorted location data to form a final array of readings; and calculating the location of the mobile railway asset based on the final array of data. It has been discovered that by utilizing the longer, second time period (where location data will be the most up-to-date) and then performing post processing on the received location data, the accuracy of the calculation will likely be increased with marginal increase in energy consumption compared to the standard accuracy mode.

Further, the same process described above can be repeated, over several instances, separated by a period of time (e.g., 60 minutes) to collect a second array of location data, that can be sorted and filtered in the same manner. Through this process, multiple instances of location data collection can be averaged together in aggregate, to permit a more precise determination of a mobile railway asset location.

Because the power cost is higher in the higher accuracy mode, the use of the higher accuracy mode may be controlled based on the occurrence of a mobile railway asset event. For example, the railcar may be equipped with one or more sensors to determine when, for example, the railcar is moving or being loaded. The controller may then choose between operating in the power saving mode, the standard accuracy mode, and the higher accuracy mode based on one or more parameters to determine which mode to operate in and to only enter the higher accuracy mode when a more accurate location is thought to be desired based on the one or more parameters.

The GNSS-enabled device also includes communication circuitry capable of short range and/or long-range wireless communication. In the context of a train consist, a short range communication is generally considered to be a communication between components on the train consist, such as a communication between a wireless sensor node and a communications management unit, and a long range communication is a communication with a device off of the train such as a cellular tower.

Long-range wireless communication with a network, such as a cellular network and/or satellite, via the communication circuitry is a highly power intensive operation much like receiving GNSS data that rapidly consumes stored energy of the power source. As such, the GNSS-enabled device may not maintain a downlink/uplink with the network unless the controller determines that such a link is necessary to communicate location data or other data. A similar energy consumption problem exists with short-range communications via the communication circuitry, albeit to a lesser extent. The short-range communication may include, for example, communication with other devices of a network of the train via a IEEE 802.15.4 protocol. In one embodiment, the GNSS-enabled device decides when to establish long-range and/or short-range communications when such communications are required rather than receiving instructions from a remote computer to initiate communications.

In one embodiment, the controller may enter the higher accuracy mode a plurality of times in response to a mobile railway asset event, determination of the mobile railway asset being stationary, and average the calculated mobile railway asset locations to obtain a highly accurate location determination for the stationary mobile railway asset. For example, the one or more sensors of the GNSS-enabled device may include a motion sensor. Upon the motion sensor detecting the mobile railway asset is stationary, the controller starts a timer (e.g., thirty minutes) and enters the higher accuracy mode if the timer expires without the mobile railway asset being moved. The controller may determine the location of the mobile railway asset using the location information gathered by the GNSS circuitry during the higher accuracy mode. The controller repeats the higher accuracy mode and location determination after set periods of time, e.g., 45 minutes. The locations of the mobile railway asset determined by the controller are then averaged to provide a more accurate result.

With reference to FIGS. 1A, a train consist 2 is provided that includes a connected group of one or more locomotives 4 and one or more railcars 100. The train consist 2 includes one or more railway asset nodes ("RANs") of the rail cars 6. In some embodiments, the RANs include communications management units ("CMU") 12 located on railcars 6 that control a respective railcar-based network 14. The RANs may alternatively or additionally include one or more sensor nodes ("SNs") and/or one or more wireless sensor nodes ("WSNs") 16. The one or more RANs may communicate with other RANs of the train consist 2 and/or another train consist 2. Alternatively or additionally, the RANs may communicate with one or more networks instantiated off of the train consist 2. For example, a RAN may communicate with a long-range wireless communication network such as a cellular network. As an example in this regard, the RAN may communicate with a remote computer via a long-range wireless communication network and the internet.

In one embodiment, the CMU 12 supports one or more WSNs 16 in the railcar-based network 14. The CMU 12 and WSNs 16 may communicate using wired or wireless approaches, such as a one or more open standard protocols such as the IEEE 802.15.4 radio standard.

The train consist 2 includes a train-based network 20 that includes the RANs, such as the CMUs 12, of the railcars 100. The RANs of the train-based network 20 may also include a powered wireless gateway ("PWG") 22 that may be located on the locomotive 4. The CMUs 12 and the PWG 22 may communicate using one or more wired or wireless approaches. The CMUs 12 and the PWG 22 include similar components except that the CMU 12 is self-powered whereas the CMU 12 utilizes power from an external source, such as the locomotive 4.

Figure 1B:
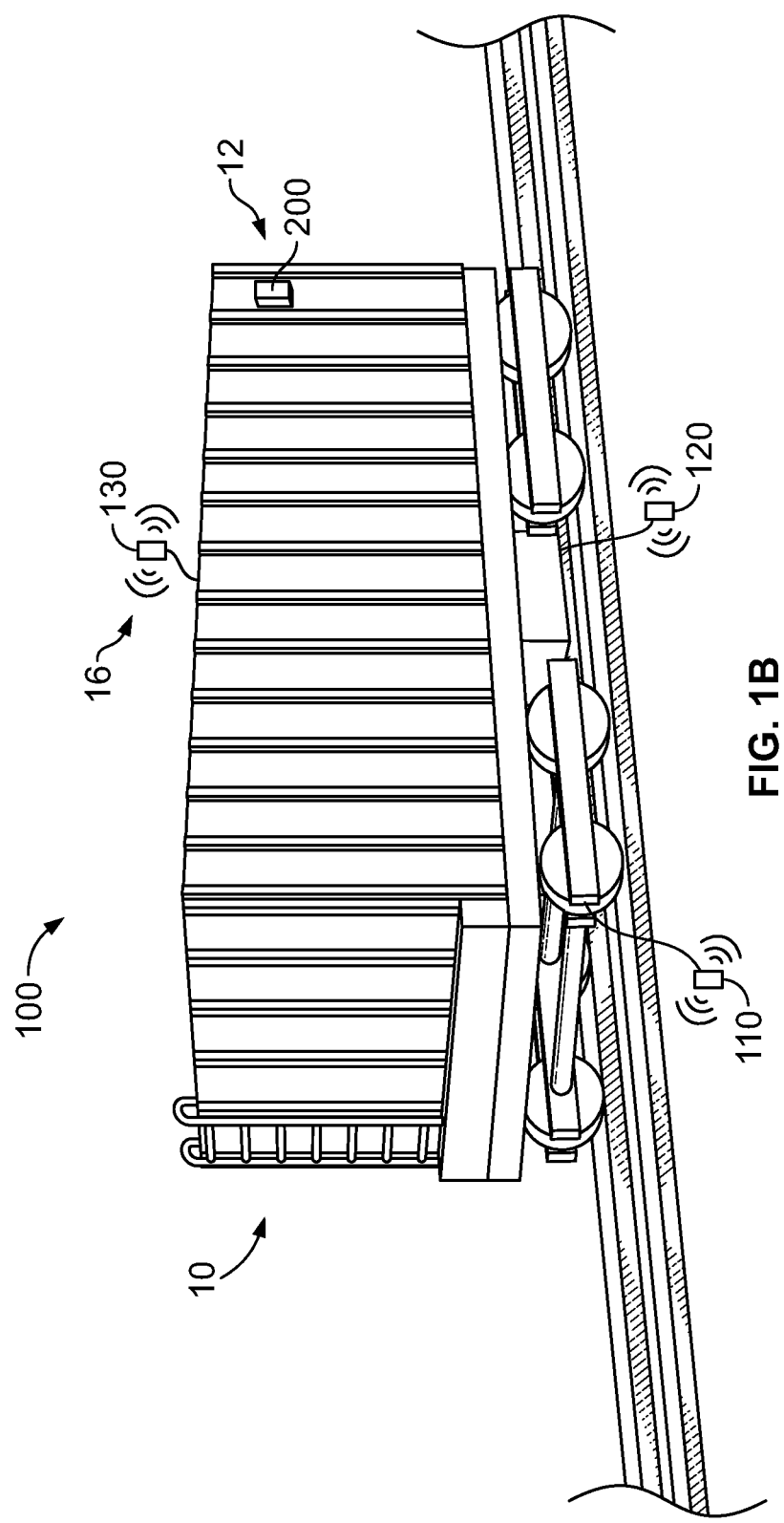
FIG. 1B is a perspective view of one of the mobile railway assets of FIG. 1A having a GNSS-enabled device and wireless sensor nodes.
Figure 2:
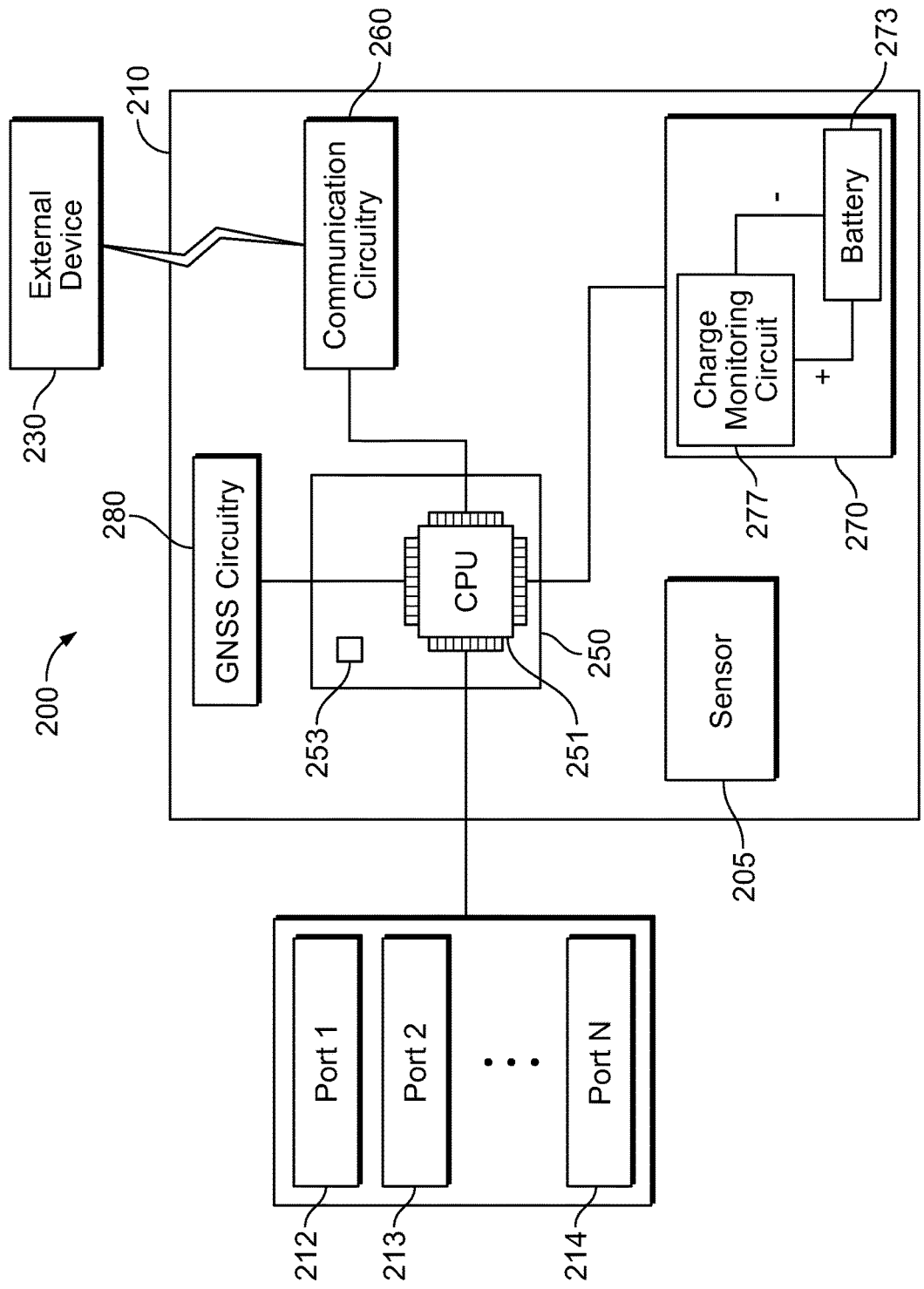
FIG. 2 is a system block diagram of the GNSS-enabled device of FIG. 1B.

With reference to FIGS. 1B and 2, one or more of the railcars 100 includes a GNSS-enabled device 200. The GNSS-enabled device 200 may constitute one of the RANs discussed above. In some embodiments, the GNSS-enabled device 200 may be the CMU 12 or the WSN 16 discussed above. In the example of FIGS. 1B and 2, a railcar system 10 is provided that includes railcar 100 having a CMU 12 in the form of the GNSS-enabled device 200 and one or more WSNs 16 such as sensors 110, 120, 130.

In some embodiments, the CMU 12 communicates its most accurate location calculation for the respective railcar 100 to the PWG 22 for a given time period and the PWG 22 communicates the location to an external device such as a remote server 22B via a network 22A such as a satellite network, cellular network, and/or the internet. The PWG 22 and/or the remote server 22B may aggregate over time the location of the railcar 100 calculated by the CMU 12. If the railcar 100 remains stationary, the locations over time are continually averaged which gives a more accurate location for the railcar 100. The remote server 22B may be maintained at a remote railroad operations center as one example.

Regarding FIGS. 1B and 2, the GNSS-enabled device 200 includes a housing 210 configured to be mounted to the railcar 100. The housing 210 may have a bracket for connecting the housing 210 to the railcar 100. The bracket can be magnetic or non-magnetic. In another embodiment, the housing 210 may have flanges with openings that receive fasteners for connecting the housing 210 to the railcar 100. Alternatively or additionally, the housing 210 may be welded to the railcar 100. The housing 210 contains a controller 250, which includes a processor 251 and a memory 253, as well as GNSS circuitry 280. When the controller 250 indicates for the GNSS circuity to be energized, in either standard or higher accuracy mode, the GNSS circuitry 280 receives location data from visible GNSS satellites. The housing 210 also contains communication circuitry 260 for communicating data indicative of the location of the railcar 100 to one or more external devices 230, such as a remote server computer, desktop computer, tablet computer, and/or a smartphone. The communication circuitry 260 may communicate the data using radio frequency signals. In one embodiment, the communication circuitry 260 may communicate with the external device 230, for example, via a cellular network, a satellite network, another wireless network, and/or the internet. The communication circuitry 260 may also utilize short range wireless communication protocols for communicating with nearby devices, such as one or more sensors 110, 120, 130 of the railcar 100 and GNSS-enabled devices 200 of nearby railcars. The short range wireless communication protocols may include, for example, Wi-Fi, NFC, and Bluetooth as examples.

In some embodiments, the processor 251 or the external device 230 determines a location of the railcar 100 based on the location data received by the GNSS circuitry 280. As discussed in greater detail below, the controller 250 has a power saving mode wherein the controller 250 inhibits the GNSS circuitry 280 from receiving location data, a standard accuracy mode wherein the controller 250 permits the GNSS circuitry 280 to receive location data for a first time period, and a higher accuracy mode wherein the controller 250 permits the GNSS circuitry 280 to receive location data for a second time period longer than the first time period.

The railcar system 10 includes a GNSS-enabled device 200 and the one or more sensors 110, 120, and 130 as shown in FIG. 1. The sensors 110, 120, and 130 are configured to determine one or more parameters of the railcar 100. The sensors 110, 120, and 130 may be, for example, one or more of: an accelerometer, a magnetometer, an image sensor, a wheel encoder, a weight sensor, a gyroscope, a link sensor, a hatch state sensor, a handbrake position sensor, a strain gauge, a reed switches, a pressure transducer, a temperature sensor, a displacement sensor, a speed sensor, and combinations thereof. The railcar 100 may be equipped with any number of sensors. The controller 250 may be configured to enter the higher accuracy mode in response to a mobile railway asset event such as a change in a parameter of the railcar, e.g., the railcar 100 stopping.

One or more of the sensors 110, 120, and 130 may connect to the communication circuitry 260 of the GNSS-enabled device 200 via one or more short-range wireless protocols. In another embodiment, one or more of the sensors 110, 120, and 130 may connect to ports 212, 213, 214 of the GNSS-enabled device 200 or via, for example, a CAN or LIN bus. The GNSS-enabled device 200 may include one or more internal sensors 205 contained within the housing 210 of the device 200. For example, the housing 210 may contain an accelerometer, a magnetometer, and/or an image sensor.

With reference to FIG. 2, the GNSS-enabled device 200 includes a limited power source 270. Such limited power source, for example, could be a battery, super capacitor and/or an energy harvesting system such as solar, vibration, or temperature differences. In one embodiment, the limited power source 270 includes at least one battery 273, such as a lithium ion or nickel-metal hydride battery, and one or more battery-level or charge monitoring circuits 277. The battery 273 may be configured to power the controller 250, the communication circuitry 260, the GNSS circuitry 280, and the one or more internal sensors 205. The controller 250 operates the communication circuitry 260, the GNSS circuitry 280, and the one or more internal sensors 205 while minimizing the energy consumption of these components. The battery 273 may additionally power peripheral devices, such as sensors, connected to the ports 212, 213, 214.

Power received at any one of the one or more ports 212, 213, 214 may be used to power the GNSS-enabled device 200, to charge the battery 273 of the GNSS-enabled device 200, or both. For example, the GNSS-enabled device 200 may include or be operatively coupled to a solar panel that provides electricity to the port 212 and the charge monitoring circuit 277 charges the battery 273 using the solar power. As another example, the GNSS-enabled device 200 may include or be operatively coupled to other energy harvesting devices such as devices that harvest energy from vibration, rotational forces, or from differences in temperature as some examples.

The communication circuitry 260 of the GNSS-enabled device 200 may be configured to communicate with external devices 230, such as sensors or other GNSS-enabled devices 200, using one or more short-range communication protocols such as, for example, Bluetooth® or Bluetooth® low-energy. The communication circuitry 260 may be configured to communicate with one or more external devices 230 using one or more long range protocols such as WiMax, LoRaWAN, and/or cellular networks (3G, 4G, 4G LTE, 5G). Further, the communication circuitry 260 may be configured to communicate over the internet. The GNSS circuitry 280 may include any commercially available GNSS chip or chip set that is configured to receive location data from one or more satellite constellations such as the Galileo, Beidou, GLONASS, or GPS satellite constellations. For example, the GNSS circuitry 280 may include a SiRFstar IV navigation processor by Qualcomm.

The controller 250 has at least three different modes that correspond to different levels of energy consumption and GNSS-enabled device 200 location accuracy. The at least three modes of the controller 250 include a power saving mode, a standard accuracy mode, and a higher accuracy mode. Although these modes are described, it will be appreciated that more modes may be utilized as desired to provide different durations of operation of the GNSS circuitry 280 and different levels of GNSS-enabled device 200 location accuracy.

The controller 250 may be programmed to change the power mode of the GNSS-enabled device 200 in response to a mobile railway asset event such as changes in parameters of the railcar 100 detected by the one or more sensors 110, 120, 130, and 205, upon expiration of one or more timers, according to a predetermined schedule, or combinations thereof.

Figure 3:
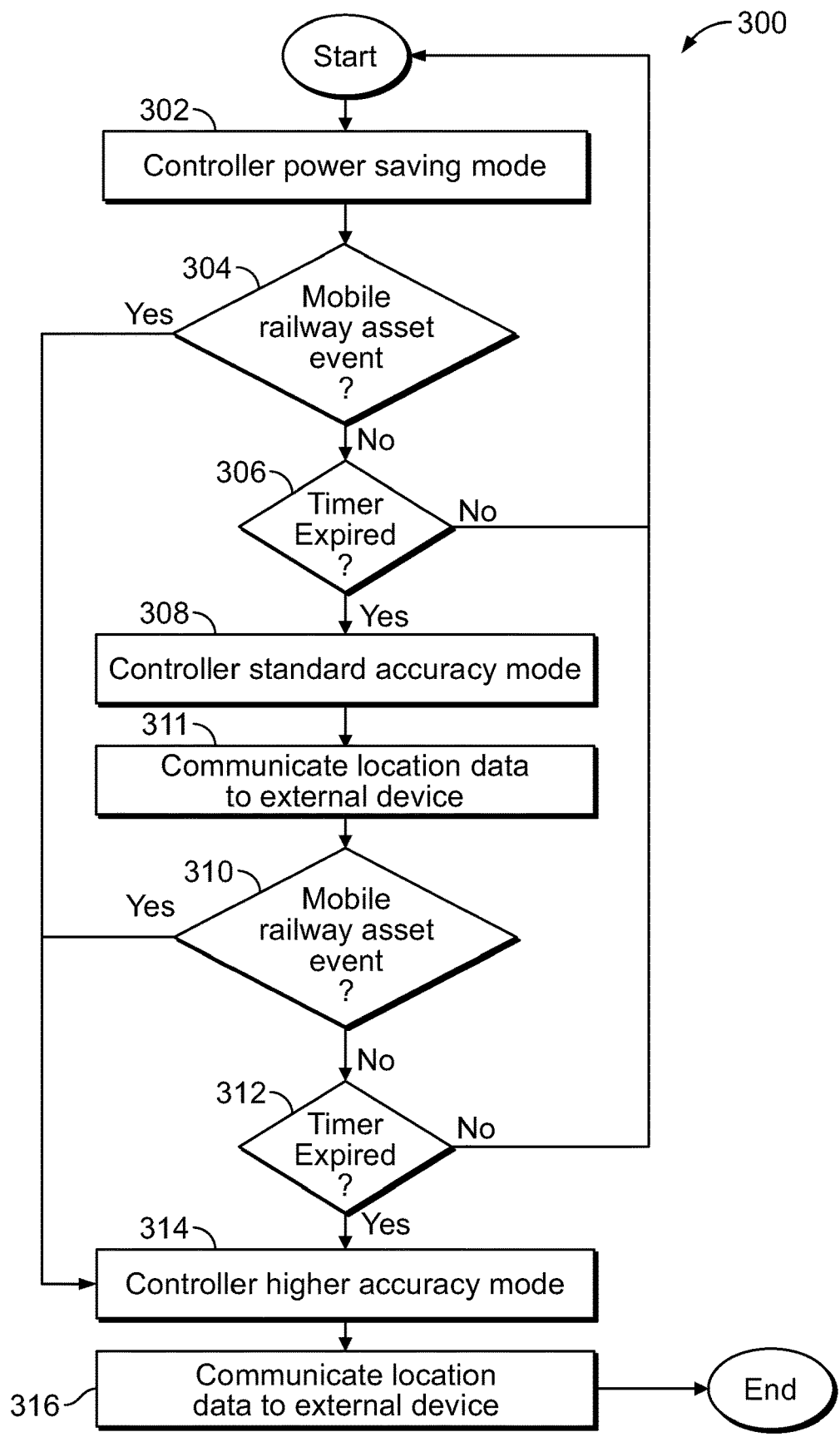
FIG. 3 is a flow chart showing a method of operating the GNSS-enabled device of FIG. 2.

With reference to FIG. 3, an example method 300 is provided of operating the GNSS-enabled device 200. The controller 250 of the GNSS-enabled device 200 starts in the power saving mode 302. The power saving mode 302 may be initiated when the controller 250 puts itself to sleep. In one embodiment, the controller 250 in the power saving mode 302 is powered down or dormant and does not draw any energy from the battery 273. The controller 250 wakes up in response to a signal at an input of the controller 250, such as a signal from one or more of the sensors 110, 120, 130, 205. As an example, the controller 250 may include a microprocessor that wakes up in response to a voltage applied to one or more of the pins of the microprocessor.

When the controller 250 of the GNSS-enabled device 200 wakes up, the controller analyzes the signal at the input of the controller 250 to determine 304 whether there is a mobile railway asset event, such as a change in at least one parameter of the railcar 100. The mobile railway asset event may be, for example, an alert, a measurement, a parameter meeting a threshold, a parameter being inside or outside of a range, and/or a change in a parameter. The controller 250 uses data collected from the sensors 110, 120, 130, and/or 205 and/or the GNSS circuitry 280 and may apply heuristics to draw conclusions based on the analysis. The chart below provides examples of parameters sensed, sensor(s) utilized, and descriptions of the heuristics applied to analyze the data.

| Parameter Sensed | Input Device | Output | Heuristic |
| --- | --- | --- | --- |
| Bearing Fitting Temperature | Temperature Sensor | Bearing Temperature | Bearing fitting temperature is correlated to bearing cup temperature using empirical data. |
| Hatch Position | Reed Switch | Hatch open/close | Determine open/closed state dependent upon state of switch. |
| Pressure | Pressure Transducer | Brake pressure | The pressure transducer is fitted directly to the trainline for measuring pressure. |
| Hand brake Link Strain | Strain Gauge | Hand brake On/Off | Hand brake link strain is correlated to the ON/OFF status of the hand brake. |
| Bolster Displacement | Hall Effect Sensor | Car Load | Bolster/side frame displacement is measured and spring stiffness data is used to convert displacement to load. |
| Bolster position | Reed Switch | Car Empty/Full | The relative position of bolster/side frame is measured. The LOADED position is determined using empirical data or spring stiffness. |
| Inner Jacket Temperature | External Temperature Sensor | Tank Car Commodity Temperature | Inner jacket surface temperature on a tank car is determined and commodity temperature can be estimated using theoretical conduction/convention laws. |
| Bolster Position | Limit Switch | Car Empty/Full | A limit switch is mounted to the side frame and activated when the bolster/side frame position is in the loaded state. |
| Sill Accelerometer | Accelerometer | Coupler Force | Impact data is collected. Using empirical data, a modal influence matrix can be computed for different coupler types that relates the impact data to the output. Using an FFT on the sampled data, and multiplying by the inverse of the modal matrix yields the input in the frequency domain. This input can be converted to the time domain to yield the coupler force. |

-continued

| Parameter Sensed | Input Device | Output | Heuristic |
|---|---|---|---|
| Bearing Fitting Accelerometer | Accelerometer | Bearing Fault Indicator | An fitting mounted accelerometer can be used to sample dynamic bearing data. An FFT can be used on data sets and plotted over time to isolate dominant modes and any shifting or relative amplification. Amplification at rolling frequency indicates a likely fault. |
| Radial Axle Accelerometer | Accelerometer | Vehicle Speed | An axle mounted accelerometer can be used to measure radial acceleration. The radial acceleration can be converted to vehicle speed using simple dynamics using the wheel and axle diameters. |
| Bearing Fitting Accelerometer | Accelerometer | Bearing Fault | A fitting mounted accelerometer can be used to sample dynamic bearing data. Kurtosis can be computed as an indicator of bearing damage. Kurtosis is measured in the time domain and requires computation of a probability density function. |
| Bearing Fitting Acoustics | Piezo-electric sensor, microphone, and accelerometer | Bearing Fault | Sampled acoustic data can be used for either an acoustic noise response or Acoustic Emission which is ring-down counts and amplitude. Empirical data from defective bearings is needed. |
| Temperature | Temperature sensor | Commodity/Fluid Pressure | A temperature sensor can be used to measure surface temperature of a pressure vessel (Tubing, tank, etc.). Heat conduction equations can be used to convert the surface temperature to fluid temperature. Using published data for the working fluid, the temperature can be converted to pressure. |
| Displacement | Displacement Sensor | Coupler Force | Coupler displacement is measured and correlated to force using force-closure curves. |
| Axle RPM | Inductive Type Sensor | Vehicle Speed | An inductive proximity sensor facing the axle can generate a signal in response to an exciter ring on the axle, and converted to vehicle speed using wheel and axle diameters. |
| Bearing Fitting Accelerometer | Accelerometer | Track Damage Detection | Sensor is mounted on an fitting or other truck component to sample dynamic data. A Probability Density Function and Kurtosis can be computed from the data. High Kurtosis, or impulsivity, will indicate track defects. A transfer function relating the wheel input to the fitting is needed, and can be determined empirically or by creating a theoretical model. |

-continued

| Parameter Sensed | Input Device | Output | Heuristic |
|---|---|---|---|
| Bearing Fitting Accelerometer | Accelerometer | Truck Hunting Detection | Sensor can be mounted on an fitting or other truck component to sample dynamic data. A simple algorithm could use an FFT to isolate known hunting frequencies. More sophisticated algorithms could detect flange impacts using time-series data. |
| Wheel Temperature | Infra-Red Temperature Sensor | Wheel Tread Temp | Wheel temperature is correlated to tread temperature using empirical data. |
| Proximity | Ultrasonic Sensor | Empty/Full status | An ultrasonic sensor could be used to detect the presence of lading in tank- cars, box-cars, covered hoppers, etc. |
| Strain | Load Cell | Car Load | Load cell on multiple places of the truck. |
| Displacement | Reed Switch | Hand brake On/Off | Position of a hand brake chain is determined and correlated to On/Off Status. |
| Bolster Accelerometer | Accelerometer | Truck tilt angles | Using a 3-axis accelerometer fixed to a bolster, the gravitational field can be used to measure the respective roll, pitch, and yaw angles with respect to fixed-earth coordinates. |
| Hatch Accelerometer | Accelerometer | Hatch Tilt | Accelerometer measures the relative tilt of hatch with fixed-earth coordinates. |
| Geofence | GNSS circuitry | Location | Location of mobile railway asset is checked to determine whether mobile railway asset entered geofenced area. |
| Speed | GNSS circuitry | Speed | Mobile railway asset stops. |

Other examples of a mobile railway asset event include, for example, the external device 230 such as a remote server computer requesting that that GNSS-enabled device 200 provide the location of the railcar 100. As an example, a customer may want to know the exact location of the railcar 100 and the railroad company's server computer sends a request to the GNSS-enabled device 200 to provide a high-accuracy calculation of the location of the railcar 100. As another example, a mobile railway asset event may include a railyard device, such as a stationary gateway 706 shown in FIG. 7, requesting that the GNSS-enabled device 200 provide a high-accuracy calculation of the location of the railcar 100.

Regarding FIG. 3, if there is no mobile railway asset event, the controller 250 determines 306 whether a timer has expired. If the timer has not expired at operation 306, the controller 250 puts itself back to sleep. The timer sets a fixed or variable time period the controller 250 waits between operations of the GNSS circuitry 280.

If the controller 250 determines 306 that the timer has expired, the controller 250 enters the standard accuracy mode 308 and energizes the GNSS circuitry 280 for a first time period. The first time period may be in the range of, for example, approximately four to approximately 40 seconds, such as 10 seconds. Once energized, the GNSS circuitry 280 starts receiving GNSS data including ephemeris data and timing data from satellites of the GNSS. The GNSS data is timestamped as it is received to permit the controller 250 to be able to determine location as well as permit the controller 250 to identify when a GNSS data set (including ephemeris and timing data) was received during the first time period. The GNSS circuitry 280 may automatically discard or not use the initial GNSS data sets, such as GNSS data sets received during a first eight seconds of a first time period lasting ten seconds, to filter the received GNSS data.

The controller 250 stops powering or energizing the GNSS circuitry 280 at the end of the first time period so that the GNSS circuitry 280 stops receiving GNSS data. As noted above, the first time period may be fixed or variable. For example, the controller 250 energizes the GNSS circuitry 280 until the GNSS circuitry 280 receives three valid readings. Whether a reading is valid or not may be determined based on details from the GNSS circuitry 280, and/or configured thresholds like HDOP, satellite count, and elevation mask. The time period required to obtain the three valid readings may vary depending on, for example, the satellites visible to the GNSS circuitry 280, impairment conditions such as atmospheric attenuation when experiencing precipitation, destructive interference from high signal reflection and spectral congestion environments, electromagnetic interference from locomotives engine emissions or traversing through electrified track environment, interference aberrations from high or sudden vibration conditions due to engine startup, rough track, wheel defects, subsidence and/or the surrounding terrain.

In one embodiment, the first time period ends once the configured number of valid readings have been obtained during the configurable search time. The controller 250 then stops energizing the GNSS circuitry 280 and the GNSS circuitry 280 returns to the power saving mode 302.

In one embodiment, the controller 250 calculates the location of the mobile railway asset 100 based on the received location data from the first time period. As an example the controller 250 may discard one or more of the initial readings to help improve accuracy without significant power cost, because the first few readings may have been calculated based on only a few visible satellites, for example, four satellites, whereas subsequent readings may have been based on a greater number of visible satellites, for example five or six satellites, available as their individual satellite ephemeris and timing data is captured. Further, the GNSS circuitry 280 itself may include optimization routines that may be used as more data is collected.

Figure 10A:
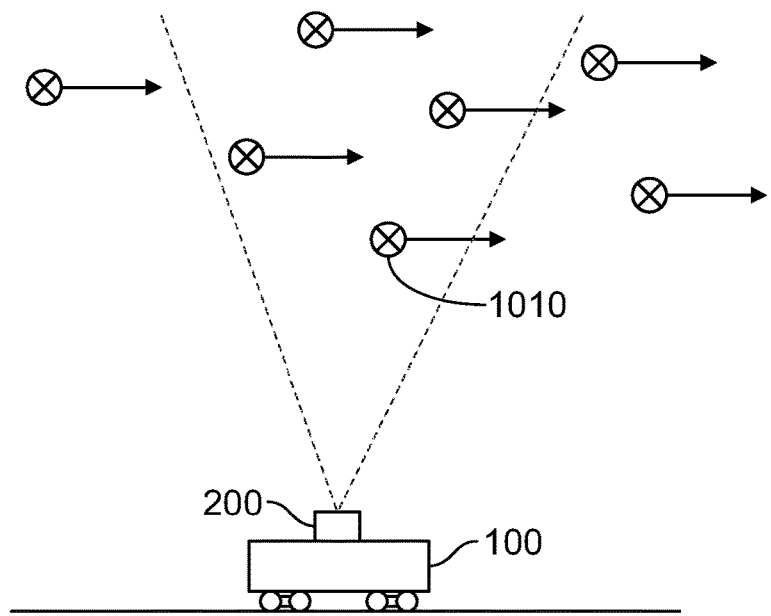
FIGS. 10A and 10B are schematic representations of the satellites visible to the GNSS-enabled device of FIG. 1B.
Figure 10B:
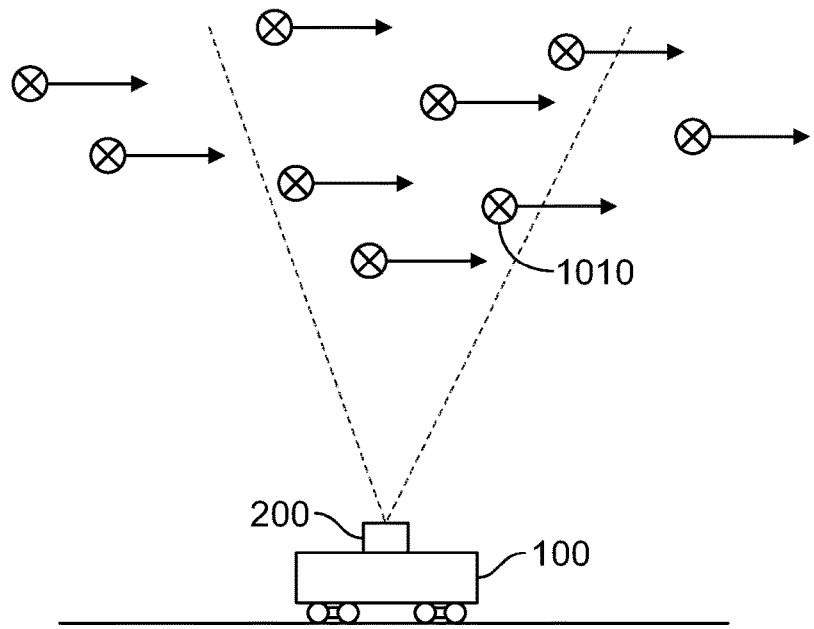

Regarding FIGS. 10A and 10B, the satellites 1010 of a GNSS constellation move in the direction of the Earth's rotation so that the satellites 1010 visible to the GNSS circuitry 280 of a GNSS-enabled device 200 change over time. Regarding FIG. 10A, during the first time period four satellites 1010 are visible to the GNSS circuitry 280. Regarding FIG. 10B, during the second time period six satellites 1010 are visible to the GNSS circuitry 280.

The controller 250 may energize the communication circuitry 260 at the same time as the GNSS circuitry 280 or the communication circuitry 260 may be powered-up at a different time such as after the collection of location data by the GNSS circuitry 280. After the controller 250 determines the location of the mobile railway asset 100 from the received location data of the first time period, the controller 250 optionally causes the communication circuitry 260 to communicate 311 the determined location of mobile railway asset 100 to the external device 230, such as by transmitting data indicative of the location of the mobile railway asset 100 to a remote server via, for example, the PWG 22, a cellular network, and the internet. The controller 250 powers down the communication circuitry 260 once the transmission of the location data to the external device 230 has completed.

In another embodiment, the controller 250 does not calculate the final location of the mobile railway asset 100. Rather, the controller 250 communicates 311 one or more samples of the received GNSS data by the communication circuitry 260 to the external device 230. For example, the samples of the received GNSS data include a first set of samples and a second set of samples. The controller 250 causes the communication circuitry 260 to only transmit the second set of the samples. As another example, the controller 250 may discard the first two readings of location data and cause the communication circuitry 260 to only communicate a third reading to the external device 230. Alternatively or additionally, the external device 230 may then use multiple instances of location data from the controller 250 as well as other external sources to calculate an accurate location of the railcar 100.

The controller 250 monitors data from the sensors 110, 120, 130, 205 and the GNSS circuitry 280 and determines 310 whether there is a mobile railway asset event for the railcar 100. The mobile railway asset event may be, for example, a change in acceleration of a component of the railcar, a change in a sound produced by a component of the railcar, a change in position of a hatch or door of the railcar, or the railcar entering a geographic area such as a geofenced rail yard. If there is no mobile railway asset event of the railcar 100, the controller 250 determines 314 whether a secondary timer has expired. The secondary timer is longer than the timer checked at operation 306 and may be used to periodically cause the controller 250 to enter the higher accuracy mode 314. The periodic collection of location data in the higher accuracy mode 314 may be desirable to provide improved accuracy during travel of the railcar 100 even though there is no mobile railway asset event of the railcar 100.

The controller 250 enters the higher accuracy mode 314 upon there being a mobile railway asset event at operations 304 or 310 or, optionally, the second timer expiring at operation 312. The higher accuracy mode 314 involves the controller 250 energizing the GNSS circuitry 280 for a second time period longer than the first time period. The second time period may be, for example, in the range of 30 seconds to 50 seconds such as 40 seconds. The second time period may be fixed or variable, such as lasting until a predetermined number of location data readings having an accuracy above a predetermined threshold have been obtained.

The longer second time period permits the GNSS circuitry 280 to receive more GNSS data and calculate a greater number of locations of the mobile railway asset that may be filtered and/or averaged to calculate the location of the railcar 100. More specifically, energizing the GNSS circuitry 280 for at least a specific period of time, for example 30 seconds, permits new GNSS data readings to be collected from a sufficient number of satellites to make accurate predictions regarding the location of the railcar 100. For example, receiving GNSS data from four to six satellites may take approximately 30 seconds.

Because the GNSS circuitry 280 will be powered for a specific period of time, for example, at least 30 seconds, it will be able to receive the most up-to-date ephemeris data containing positional details of the visible satellites. This is relevant because a faster, but less accurate, location could potentially be calculated based on a smaller number of satellites that already have ephemeris data stored in the GNSS circuitry 280. But the available satellites may be limited to, for example, four satellites and the satellites may be at a different position than is stored in the GNSS circuitry 280, which can result in a less accurate reading. In other words, the GNSS circuitry 280 may make a location determination based on stale ephemeris data if the GNSS circuitry is energized only for a period of time to obtain GNSS data from four satellites. Keeping the GNSS circuitry 280 energized for a specific period of time, for example at least 30 seconds, allows for ephemeris data to be received from all visible satellites in the constellation.

The controller 250 powers down the GNSS circuitry 280 at the end of the second time period and the controller 250 returns to the power saving mode. The controller 250 may determine the location of the railcar 100 based on the GNSS data received during the second time period and cause the communication circuitry 260 to communicate 316 the location to the external device 230. Alternatively, the controller 250 may facilitate communication of at least a portion of the received GNSS data to the external device 230 and the external device 230 calculates the more accurate location of the railcar 100. It will be appreciated that the operation of the communication circuitry 260 to communicate data to the external device 230 may be concurrent with, partially concurrent with, or subsequent to the first and second time periods. Further, the controller 250 may store the GNSS data and/or the averaged GNSS data in the memory 253. The controller 250 may store the data until a threshold number of measurements has been accumulated and then operate the communication circuitry 260 to communicate the stored data to the external device 230.

The controller 250, or the external device 230, that determines the location of the railcar 100, may utilize a post-processing algorithm that operates as a filter to obtain a high-accuracy location of the railcar 100 from the GNSS data received during the second time period. In one embodiment, the GNSS data collected during the second time period is time stamped as the GNSS data sets are received. The post-processing algorithm is performed by a method that involves discarding or not using a first portion of the GNSS data collected, such as the first eight sets of GNSS data, as the earlier GNSS data sets may contain fewer satellites as part of the calculation, and/or ephemeris data that is out of date. As an example, the second time period may be 40 seconds and the method includes discarding or not using ephemeris data collected during a first portion of the second time period, such as during the first 30 seconds of the 40 second time period. The remaining second portion of the GNSS data, such as data collected during the last 10 seconds, is used to determine the location of the railcar 100. The second portion of the GNSS data may be more accurate than the first portion (as described above) such that determining the location based on only the second portion provides satisfactory accuracy.

The controller 250 may use a predetermined or learned duration of the first time period and/or the second time period as the basis for discarding data. The controller 250 may learn the appropriate time period for discarding GNSS data through feedback calculations performed by the controller 250 or the external device 230 that specifies whether or not the calculated location of the railcar 100 was within an acceptable tolerance. In one embodiment, the time period may be learned through empirical devices in the field. Based on the empirical results, a set of logical rules may be established to provide the time period that should be used based on one or more inputs, e.g., time of day, type of mobile railway asset, and weather. In another embodiment, the time period may be determined using machine learning. For example, real-world testing data including environmental inputs, GNSS receiver energization duration, and resulting location accuracy could be provided to a machine learning system. The machine learning system would provide categorization for different time periods based on current environmental inputs and desired accuracy.

Figure 4:
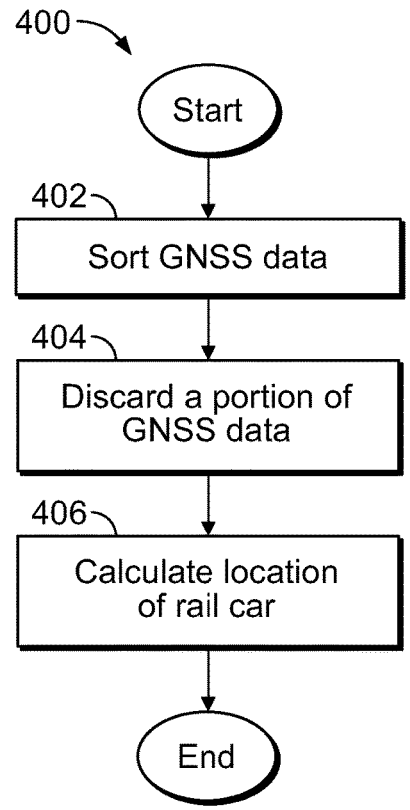
FIG. 4 is a flow chart of a method for calculating the location of the mobile railway asset using the GNSS-enabled device of FIG. 2.

With reference to FIG. 4, another method 400 is provided for obtaining a high-accuracy estimate of the location of the railcar 100 based on the GNSS data received during the second time period. The method 400 includes sorting 402 the GNSS data received during the second time period. The sorting 402 may include sorting the GNSS data based on satellite count, HDOP, and/or other factors. The method 400 includes discarding 404 a portion of the GNSS data based on parameters associated with each instance of the GNSS data. For example, the GNSS data having a satellite count lower, or HDOP higher (which is less accurate), than a set threshold is discarded. The method 400 further includes calculating 406 the location of the railcar 100 based on the remaining readings having accuracies above the set threshold.

After the controller 250 enters the higher accuracy mode, the controller 250 may send a confirmation request via the communication circuitry 260 to request the external device 230, or a user thereof, to specify whether the controller 250 was correct to enter the higher accuracy mode. This feedback allows the GNSS-enabled device 200 to learn when the higher accuracy mode was properly entered and thus reduces the number of occurrences of the device entering the higher accuracy mode unnecessarily.

Figure 6:
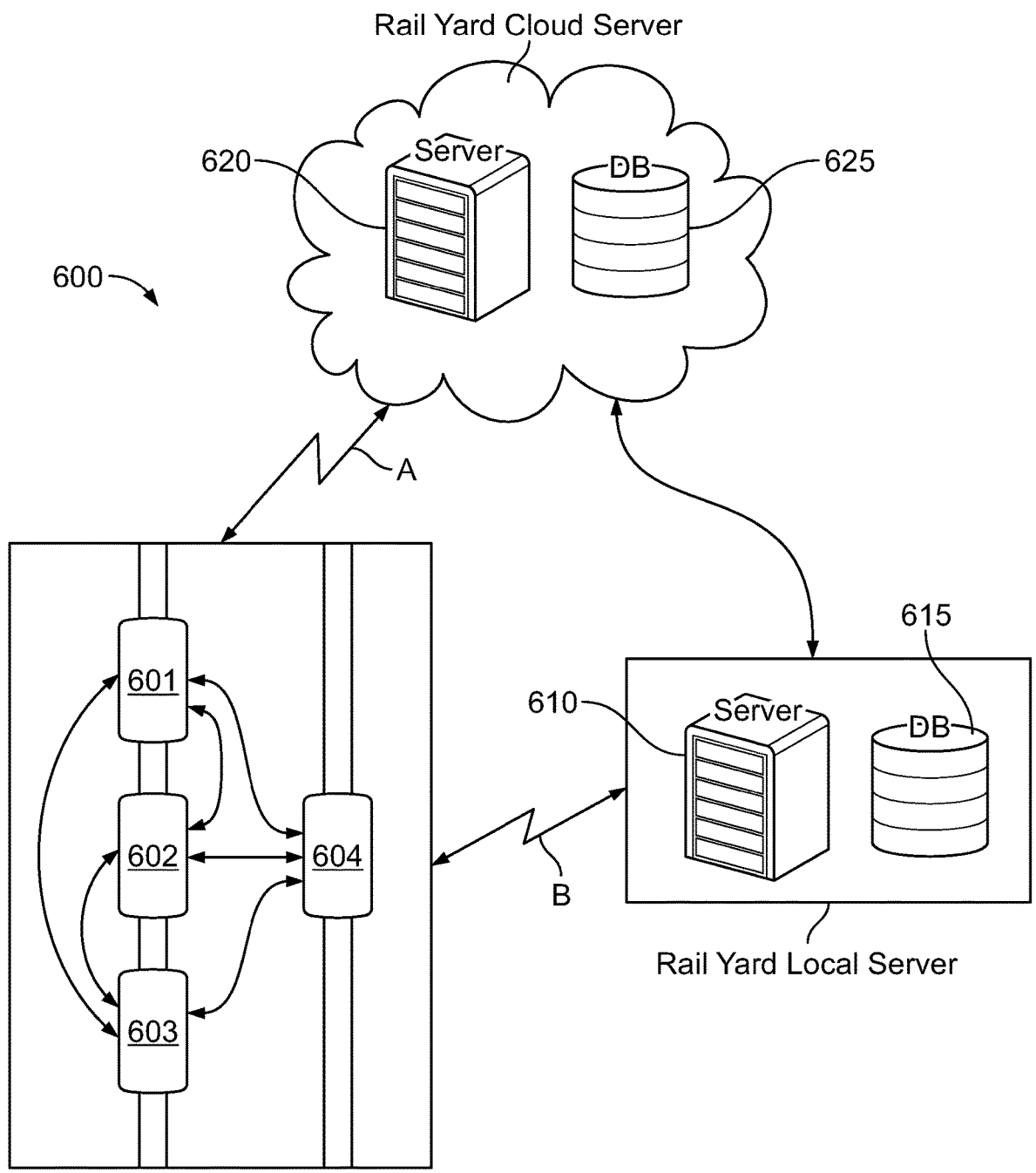
FIG. 6 is a schematic representation of a system implementing GNSS-enabled devices according to the present disclosure.

Regarding FIG. 6, a system 600 is provided including one or more GNSS-enabled devices 200 of one or more railcars 601, 602, 603, 604. The GNSS-enabled devices 200 are capable of communicating with one another via a short range communication protocol such as Bluetooth® or Bluetooth® low-energy or other wireless communication method. Similarly, each of the GNSS-enabled devices 200 are also capable of communicating with one or more external devices 230 using one or more long-range communication protocols such as 3G, 4G, 4G LTE, 5G cellular protocols and satellite. In one embodiment, the system 600 includes the one or more external devices 230, such as a local rail yard server 610, a local rail yard database 615, a remote server such as a cloud-based server 620, and/or a remote database such as a cloud-based database 625. The databases 615 and 625 may collect and compile learning data from each powered GNSS-enabled device 200. As such, when a GNSS-enabled device 200 connects to either the server 620 or the server 610, learning data indicating when a GNSS-enabled device 200 should enter a higher accuracy mode may be downloaded to the GNSS-enabled device 200 thus expediting the learning process and saving power.

The communication circuitry 260 may connect to the one or more external devices 230 using one or more networks. For example and as discussed above, the GNSS-enabled devices 200 of a train may form a train-based network 20 with a wireless gateway such as a PWG 22 on the locomotive 4 of the train 2 (see FIG. 1A). The train-based network 20 may utilize the Bluetooth®, Bluetooth® low-energy, and/or 6LoWPAN protocols as some examples. The PWG 22 may have long-range communication interface (e.g. 3G, 4G, 4G LTE, 5G cellular protocol, satellite) that communicates data from the GNSS-enabled devices 200 to the one or more external devices 230. The PWG 22 may be a powered using the energy from the locomotive and/or a battery or energy harvesting method. The GNSS-enabled devices 200 may be synchronized such that the GNSS-enabled devices 200 form the train-based network 20 at scheduled times to facilitate data transfer from the one or more GNSS-enabled devices 200 installed on railcars 100 to the PWG 22, which in turn communicates the data to the one or more external devices 230. This approach conserves battery power by using short-range communication protocols of the communication circuitry 260 instead of long-range communication protocols. Alternatively, if a location of two or more railcars 601, 602, 603, 604 is desired, the GNSS-enabled devices 200 of the railcars 601, 602, 603, 604 may communicate GNSS data between each other. Then only one of the two or more GNSS-enabled devices 200 installed on railcars 601, 602, 603, 604 need to communicate with the external device 230 using long-range communications thus saving power on the other GNSS-enabled devices. The GNSS-enabled device 200 may alternatively or additionally communicate with the external device 230 without the PWG 22, such as by connecting to a cellular or satellite network and/or via a railway connected facility gateway such as the stationary gateway 706.

Figure 7:
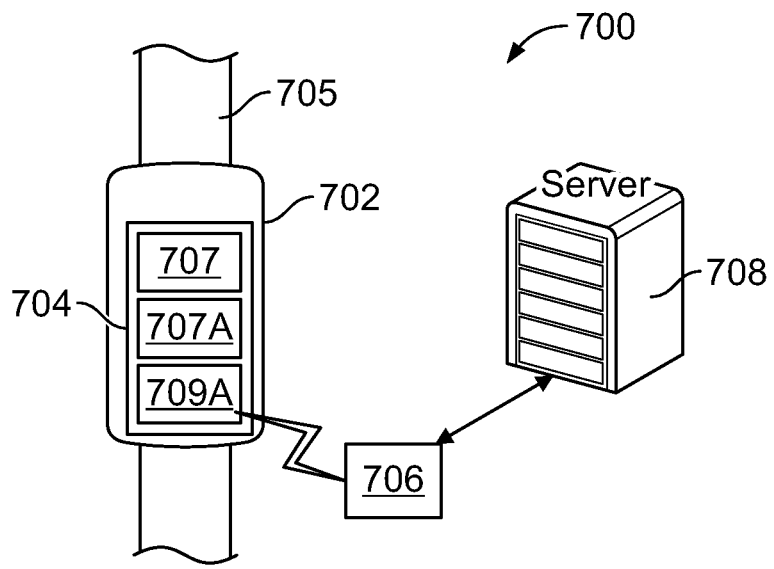
FIG. 7 is a schematic representation of a system for monitoring the location of a mobile railway asset.

Regarding FIG. 7, a system 700 is provided for monitoring the location of a mobile railway asset, such as a railcar 702, in a rail yard. The system 700 includes a GNSS-enabled device, such as a communication management unit (CMU) 704, and one or more stationary gateways 706. The CMU 704 may be similar to the GNSS-enabled device 200 discussed above and includes communication circuitry configured to communicate with the stationary gateway 706. The CMU 704 may communicate with the stationary gateway 706 using, for example, a wireless protocol such as Wi-Fi, Bluetooth, WiMax, or LoRaWAN. Alternatively or additionally, the CMU 704 may also communicate with the stationary gateway 706 indirectly such as via a powered wireless gateway of a locomotive associated with the railcar 702. The system 700 may also include a remote computer, such as a server computer 708, that communicates with the stationary gateway 706 via one or more networks. In one embodiment, the server computer 708 communicates with the stationary gateway 706 via the internet and a wireless router at the rail yard.

Figure 8:
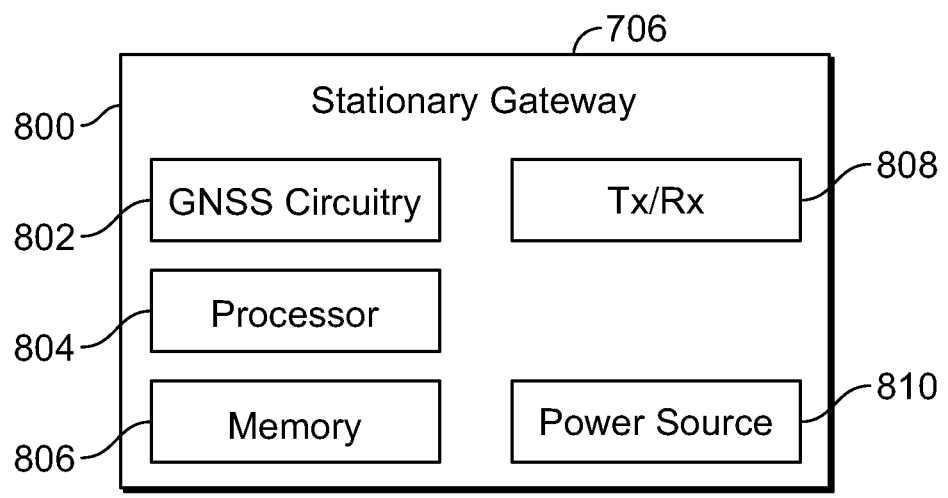
FIG. 8 is a block diagram of a stationary gateway of the system of FIG. 7.

Turning to FIG. 8, the stationary gateway 706 includes a housing 800 that contains GNSS circuitry 802, a processor 804, a memory 806, and a communication interface 808. The communication interface 808 may include a wireless communication interface for communicating wirelessly via one or more wireless communication protocols directly or indirectly with the CMU 704. The wireless communication interface may also be configured to communicate with the server computer 708. In one embodiment, the communication interface 808 includes a wired communication interface such as an ethernet adapter. The stationary gateway 706 further includes a power source 810, which may provide continuous power to permit the stationary gateway 706 to continuously self-survey using GNSS data. The power source 810 may include a wired connection to mains electric power. Alternatively or additionally, the power source 810 may include an energy harvesting power source such as a solar panel system including a battery.

Regarding FIGS. 7 and 8, when the railcar 702 is within a railway connected facility, the system 700 permits an accurate determination of which railroad track 705 the railcar 702 is on. The CMU 704 includes but is not limited to a controller 707, a power source 707A, and GNSS circuitry 709A. The controller 707 has a power saving mode wherein the controller 707 inhibits operation of the GNSS circuitry 709 to preserve power of an electrical source of the CMU 704, a standard accuracy mode wherein the controller 707 permits the GNSS circuitry 709 to receive GNSS data for a first time period, and a higher accuracy mode wherein the controller 707 permits the GNSS circuitry 709 to receive GNSS data for a second time period longer than the first time period. In one approach, the first period of time permits the CMU 704 to determine a current location of the railcar 702 and the longer, second period of time permits the CMU 704 to determine a self-survey location of the railcar 702.

In some instances, the operation of the GNSS circuitry 709 for the first time period when the controller 707 is in the standard accuracy mode does not permit the GNSS circuitry 709 to receive enough GNSS data, or enough accurate GNSS data, from the GNSS satellites to determine which railroad track 705 the railcar 702 is on. To achieve the required track-level accuracy, the controller 707 may enter the higher accuracy mode.

Instead of, or in addition to, operating the controller 707 in the higher accuracy mode, the CMU 704 may accurately determine which railroad track 705 the railcar 702 is on by utilizing data from the stationary gateway 706. A railway connected facility, such as a rail yard, has one or more stationary gateways 706 adjacent the tracks 705 of the facility.

The stationary gateway 706 includes the power source 810 having a constant power supply, such as a mains electric supply. The power source 810 may include a battery backup in the event of disruption to the mains electric supply and/or an energy harvesting power source such as a solar panel system. The processor 804 executes GNSS control software stored in the memory 806 that causes the GNSS circuitry 802 to perform a self-survey over an extended time period, for example 48 hours, which allows for multiple transitions of the satellite constellation, resulting in a more accurate representation of the stationary gateway. Because the GNSS circuitry 802 can perform a self-survey for an extended time period, the stationary gateway 706 may obtain a location of the stationary gateway 706 that is more accurate than the location of the railcar 702 the CMU 704 determines when the controller 707 is in the standard accuracy mode. The self-survey location determined by the stationary gateway 706 may thereby be a highly accurate benchmark location for the stationary gateway 706.

The stationary gateway 706 may be powered all the time and may constantly be receiving GNSS data from GNSS satellites. The stationary gateway 706 is stationary and the GNSS data received can be aggressively filtered to keep only the highest quality "fixes" of high satellite count and low HDOP. All these values can be averaged over many weeks to ensure a very accurate self-survey location or benchmark location.

In addition to determining the self-survey location by operating the GNSS circuitry 802 for extended periods, the stationary gateway 706 constantly determines current locations of the stationary gateway 706 by operating the GNSS circuitry 802 for short time periods similar to the first time period associated with the standard accuracy mode of the controller 707 of the CMU 704. The stationary gateway 706 determines current location error data by comparing the current location of the stationary gateway 706 to the self-survey location of the stationary gateway 706. The difference between the current location and the self-survey location of the stationary gateway 706 at a given time represents the error in GNSS data that may be due to the arrangement of satellites, weather, terrain, etc. The current location error data may include various types of data indicative of the skew in GNSS data, such as a current position error vector. As discussed below, the CMU 704 and/or the server 708 may use the current location error data in addition to the GNSS data obtained during the first time period of operation of the GNSS circuitry 709 to obtain an accurate determination of the railroad track 705 the railcar 702 is on without the GNSS circuitry 709 performing a self-survey and requiring electrical power for the second time period.

The CMU 704 includes one or more sensors connected to the controller 707 so that the controller 707 detects a mobile asset railway event such as when the railcar 702 has stopped within the railway connected facility. Upon the railcar 702 being stopped for a predetermined period of time, the controller 707 enters the standard accuracy mode and determines a current position based on GNSS data received from the GNSS circuitry 709. In one embodiment, the CMU 704 requests the current location error data from the stationary gateway 706. The difference between the current location and the self-surveyed location may, in one approach, provide a current location error. The stationary gateway 706 determines the current location error data, e.g., a current location error vector, by comparing the current location of the stationary gateway 706 with the self-surveyed location determined by the stationary gateway 706. The CMU 704 uses the current location error data to correct the current location reading obtained by operating the GNSS circuitry 709 for the first time period. For example, the controller 707 of the CMU 704 may add the current position error vector to the current location to obtain a more accurate identification of which railroad track 705 the railcar 702 is on.

In another embodiment, the CMU 704 uses the current location error data from the stationary gateway 706 to improve the location accuracy of the CMU 704. Because the stationary gateway 706 and the CMU 704 are in close geographical proximity, such as in the same rail yard, the GNSS circuitries 709A, 802 may see the same GNSS satellites in the same positions in the sky and may experience similar position errors. The location of the CMU 704 may thereby be calibrated using the error at the stationary gateway 706 to provide a more accurate location without the CMU 704 having to perform a self-survey.

Further, the location of the stationary gateway 706 may be known with a high level of confidence based on the extended self-survey(s) performed by the stationary gateway 706 and, in some examples, the stationary nature of the stationary gateway 706. The location of the CMU 704 may be known with less certainty, due to the shorter GNSS data receiving periods employed by the CMU 704, in comparison to the self-surveys performed by the stationary gateway 706, and the movable nature of the mobile railway asset. The more certain location of the stationary gateway 706 may be used as a guide when determining the location of the CMU 704. By utilizing GNSS data from the stationary gateway 706, the CMU 704 is able to achieve the desired position accuracy while using less power than is required for a self-survey.

Figure 9:
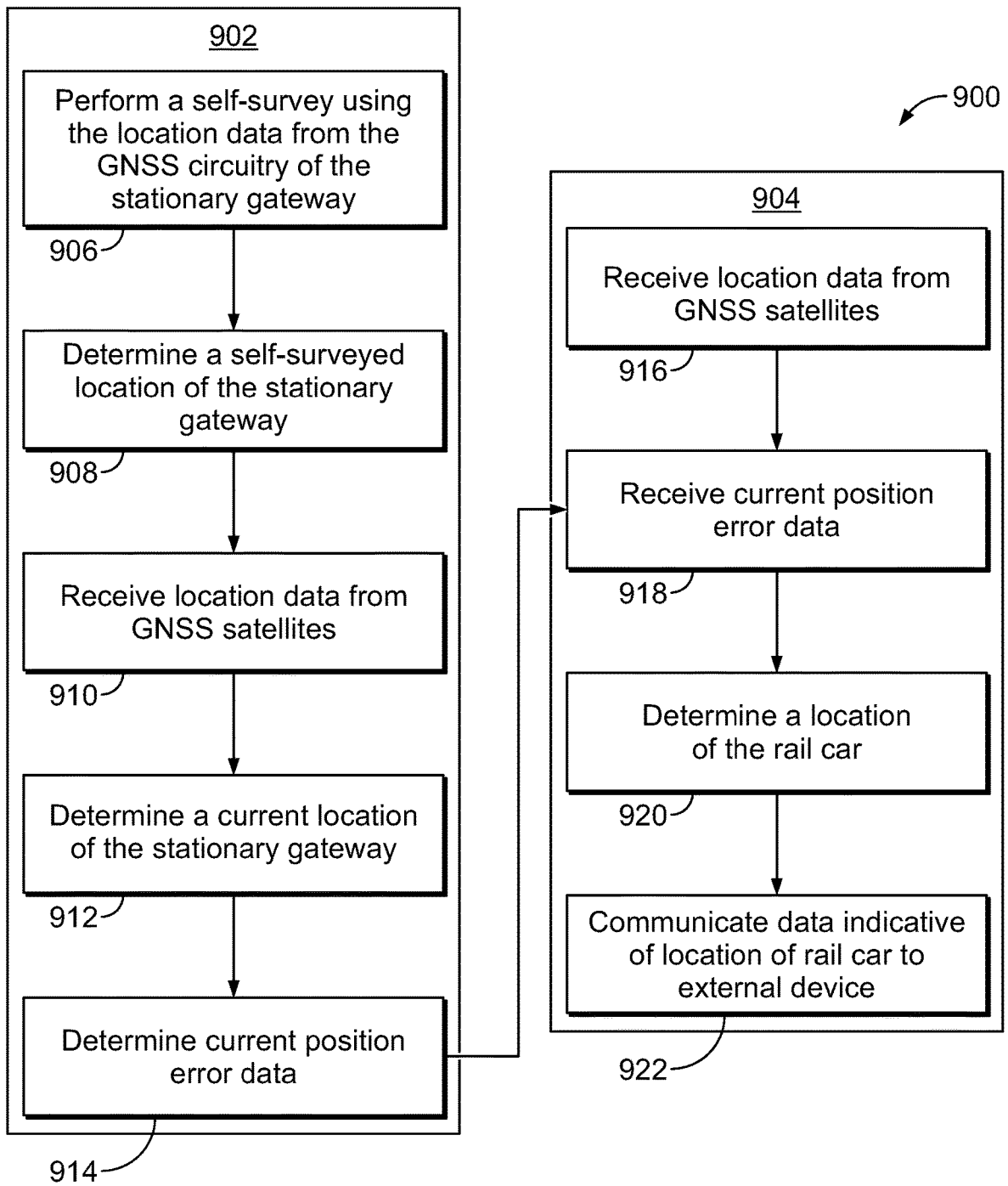
FIG. 9 is a flow chart showing a method of locating a rail car using the stationary gateway of FIG. 8.

With reference to FIG. 9, a method 900 is provided for locating a mobile railroad asset at a railway connected facility. The method 900 includes operations 902 performed by the stationary gateway and operations 904 performed by the CMU 704.

At operation 906, the processor 804 of the stationary gateway 706 directs a self-survey using GNSS data received by the GNSS circuitry 802. The operation 906 may involve receiving GNSS data from the GNSS satellites during one or more self-surveys. The operation 906 may, for example, last several days, in some embodiments.

At operation 908, the processor 804 determines a self-surveyed location of the stationary gateway 706. The self-surveyed location provides a highly accurate benchmark of the location of the stationary gateway 706. The processor 804 of the stationary gateway 706 stores the self-surveyed location in the memory 806 of the stationary gateway 706.

At operations 910 and 912, the stationary gateway 706 receives GNSS data from GNSS satellites and determines an instantaneous or current location of the stationary gateway 706. The GNSS circuitry 802 of the stationary gateway 706 is operated to receive GNSS data from satellites for a period of time that is significantly shorter than the period of time used in operation 906, such as one second or less.

At operation 914, the processor 804 determines current location error data by comparing the self-surveyed location and the current location. In one embodiment, the processor 804 determines one or more current position error vectors that represent the error between the highly accurate self-surveyed location and the less accurate current location.

The operations 904 performed by the CMU 704 include operation 916, which involves receiving GNSS data from satellites using the communication circuitry 709A of the CMU 704. The operation 916 may involve the controller 707 of the CMU being in the standard accuracy mode thereof which operates the communication circuitry 709A for the first time period. This relatively short time period permits the GNSS circuitry of the CMU 704 to receive enough GNSS data from satellites to obtain a rough estimate of the location of the CMU 704 and railcar 702 associated therewith. In one embodiment, the first time period of operation 916 is similar to the length of time the GNSS circuitry 802 is operated at operation 910.

At operation 918, the CMU 704 receives the current location error data from the stationary gateway 706. The CMU 704 may query the stationary gateway 706 for the current location error data. In another approach, the stationary gateway 706 continually wirelessly broadcasts the current location error data for receipt by the CMU 704 when the CMU 704 is in range of the stationary gateway 706.

At operation 920, the CMU 704 determines a location of the railcar 702 using the GNSS data obtained at operation 916 and the current location error data received at operation 918. By utilizing the current location error data, the CMU 704 may determine the location of the railcar 702 without the GNSS circuitry of the CMU 704 having to perform a self-survey.

The CMU 704 may communicate 922 data indicative of the location of the railcar 702 to an external device, such as the server computer 708, locomotive powered wireless gateway or stationary gateway.

In another embodiment, the communication circuitry 709A of the CMU 704 communicates data indicative of the current location of the CMU 704 to the server computer 708. In some embodiments, the communication is via the stationary gateway 706 and in other embodiments the communication bypasses the stationary gateway 706 such as the CMU 704 communicating the data via the PWG 22. The stationary gateway 706 likewise communicates the current location error data to the server computer 708. The server computer 708 determines the location of the railcar 702, including which track 705 the railcar 702 is on, using the current GNSS data from the CMU 704 and the current location error data from the stationary gateway 706. As an example, the stationary gateway 706 may send a current position error vector to the server computer 708 every second. Further, the server computer 708 may receive current location error data from multiple stationary gateways 706 at a facility. The server computer 708 may select the current location error data from one or more of the stationary gateways 706 depending on the current location provided by the CMU 704. This permits the server computer 708 to select, for example, the stationary gateway(s) 706 that are closest to the railcar 702 so the error observed by the stationary gateway(s) 706 are effectively the same as the error observed by the CMU 704.

Figure 11:
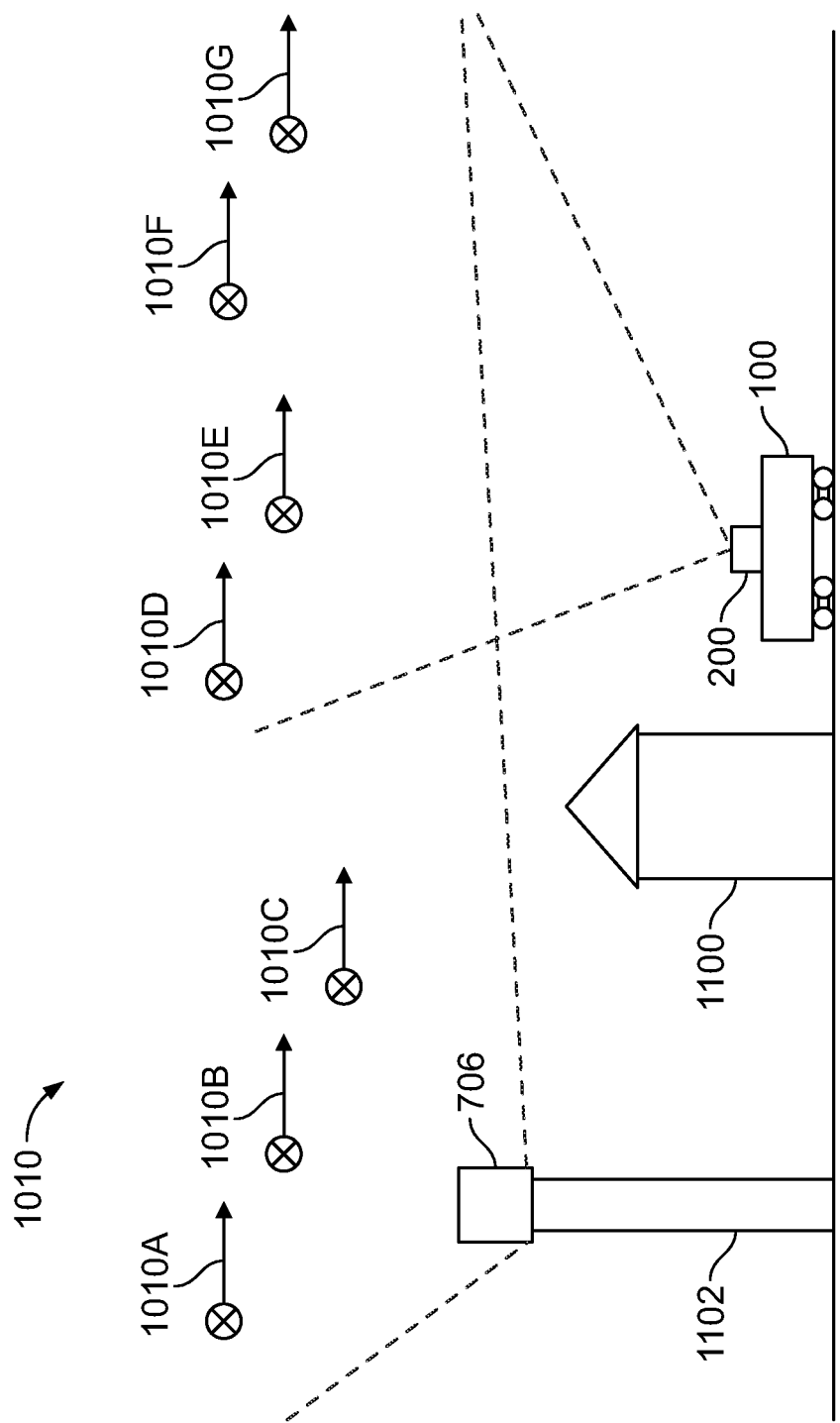
FIG. 11 is a schematic representation of the stationary gateway of FIG. 8 receiving GNSS data from a greater number of satellites than the GNSS-enabled device of a mobile railway asset due to a building obstructing the GNSS-enabled device.

Regarding FIGS. 9 and 11, in some situations the satellites 1010 visible to the stationary gateway 706 and the GNSS-enabled device 200 may be different. The stationary gateway 706 and/or the server computer 708 may only provide the current location error data based on the satellites 1010 that are visible to the GNSS-enabled device 200. This tailored error data is received by the GNSS-enabled device 200 at operation 918. Alternatively, the GNSS-enabled device 200 may receive 918 current location error data for all the satellites 1010 that are visible to the stationary gateway 706 and then filter the data to error data based on the satellites 1010 visible to the GNSS-enabled device 200. The stationary gateway 706, sever computer 708, and/or GNSS-enabled device 200 may set a flag or other indication representing that there is a discrepancy in satellites 1010 visible to the GNSS-enabled device 200. The flag may cause the devices performing the method 900 to tailor the error data to the satellites visible to the GNSS-enabled device 200.

For example and with reference to FIG. 11, the railcar 100 is positioned next to a building 1100 and the GNSS-enabled device 200 of the railcar 100. The building 1100 inhibits the GNSS enabled device 200 from receiving GNSS data from the satellites 1010A, 1010B, 1010C. The stationary gateway 706 is mounted on a tall support 1102 and can receive GNSS data from all of the satellites 1010A-1010G. The GNSS-enabled device 200 receives 918 the current location error data as determined by the stationary gateway 706 using only the satellites 1010D, 1010E, 1010F, 1010G. The GNSS-enabled device 200 may then determine 920 the location of the railcar 100 and communicate 922 data indicative of the location of the railcar 100 to an external device.

In some embodiments, the stationary gateway 706 determines 912 the current location of the stationary gateway 706 and communicates the current location to the server computer 708. The server computer 708 determines 914 the current location error data and determines 920 the location of the railcar 100. Regarding FIG. 11, The GNSS-enabled device 200 calculates location fixes and communicates the location fixes to the server computer 708 with satellite identifiers indicating the satellites 1010D-1010G that sent the GNSS data used by the GNSS-enabled device 200. The server computer 708 commands the stationary gateway 706 to determine 912 the current location of the stationary gateway 706 based only on satellites 1010D-1010G, and to communicate the current location to the server computer 708. The server computer 708 determines 914 the current location error data based only on satellites 1010D-1010G and determines 920 the location of the railcar 100.

Figure 12:
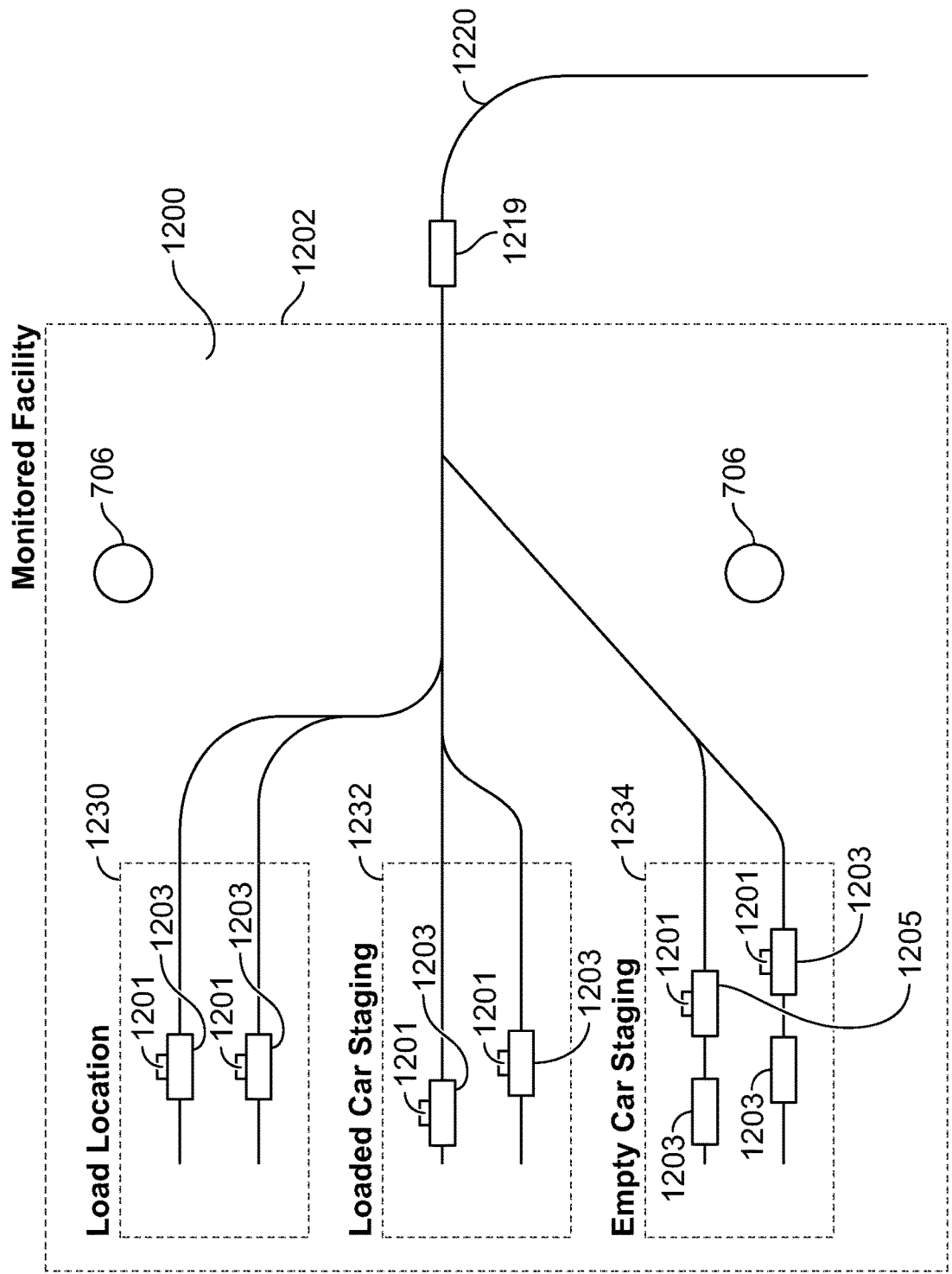
FIG. 12 is a schematic representation of a rail yard having stationary gateways of FIG. 8 for communicating GNSS error data to GNSS-enabled devices of mobile railway assets in the rail yard.

Regarding FIG. 12, a rail connected facility 1200 is provided that includes stationary gateways 706 configured to communicate current location error data to railcars such as railcars 1203, 1205, and 1219 that include GNSS-enabled devices 1201 similar to the GNSS-enabled devices 200 discussed above. The rail facility 1200 is located within a geofenced area 1202. The railcar 1219 entering the geofenced area 1202 along track 1220 causes the GNSS-enabled device 1201 of the railcar 1219 to enter a standard accuracy mode and receive GNSS data. The GNSS-enabled device 1201 of the railcar 1219 may determine a location of the railcar 1219 using the received GNSS data and current location error data received from one or both of the stationary gateways 706. The rail facility 1200 may include one or more dedicated areas such as a load location area 1230, a loaded car staging area 1232, and an empty car staging area 1234. The areas 1230, 1232, 1234 may be geofenced so that the GNSS-enabled devices 200 of the railcars 1203, 1205 determine locations of the railcars 1203, 1205, using GNSS data and current location error data from the stationary gateways 706, 706 upon the railcars 1201, 1203, 1205, 1218 entering the areas 230, 1232, 1234.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. An apparatus for locating a mobile railway asset, the apparatus comprising:
    a limited power source;
    global navigation satellite system (GNSS) circuitry configured to utilize electrical power from the limited power source to receive GNSS data from satellites of a GNSS;
    a controller operatively coupled to the limited power source and the GNSS circuitry, wherein the controller has:
        a power saving mode wherein the controller inhibits the GNSS circuitry from receiving GNSS data;
        a standard accuracy mode wherein the controller permits the GNSS circuitry to receive GNSS data for a first time period; and
        a higher accuracy mode wherein the controller permits the GNSS circuitry to receive GNSS data for a second time period longer than the first time period;
    the controller configured to enter the higher accuracy mode and permit the GNSS circuitry to receive GNSS data for the second time period in response to a determination of a mobile railway asset event;
    communication circuitry operatively coupled to the controller; and
    the controller configured to, in response to the determination of the mobile railway asset event, control the communication circuitry to communicate to a remote computing device data indicative of a location of the mobile railway asset based at least in part on the GNSS data received during the second time period of the higher accuracy mode.

2. The apparatus of claim 1 wherein the controller is operably coupled to a sensor and the controller is configured to receive data from the sensor and the GNSS circuitry; and
    wherein the controller is configured to determine the mobile railway asset event based at least in part on data from at least one of the sensor and the GNSS circuitry.

3. The apparatus of claim 1 further comprising at least one sensor configured to detect at least one parameter of the mobile railway asset; and
    the controller is configured to determine the mobile railway asset event in response to a change in the at least one parameter of the mobile railway asset.

4. The apparatus of claim 3 wherein the at least one sensor includes at least one of:
    a temperature sensor;
    a reed switch;
    a pressure transducer;
    a strain gauge;
    a hall effect sensor;
    a temperature sensor;
    a limit switch;
    an accelerometer;
    a piezo-electric sensor;
    a microphone;
    an inductive-type sensor; and
    a load cell.

5. The apparatus of claim 1 wherein the communication circuitry is configured to receive a request for location of the mobile railway asset from an external device; and
    wherein the controller makes the determination of the mobile railway asset event upon the communication circuitry receiving the request for the location of the mobile railway asset from the external device.

6. The apparatus of claim 1 wherein the controller is configured to determine a location of the mobile railway asset based at least in part on the GNSS data received during the first time period, the controller further configured to determine the mobile railway asset event in response to the mobile railway asset location being within a predetermined area.

7. The apparatus of claim 1 wherein the communication circuitry is configured to communicate the data indicative of the location of the mobile railway asset to the remote computing device via a powered wireless gateway of a locomotive; and
wherein the communication circuitry is configured to wirelessly receive sensor data from a wireless sensor node configured to be mounted on the mobile railway asset.

8. The apparatus of claim 1 wherein the controller is configured to determine a location of the mobile railway asset by receiving GNSS data during the second time period and utilizing less than all of the GNSS data received during the second time period.

9. The apparatus of claim 1 wherein the controller is configured to determine an accuracy of the GNSS data and the controller is configured to determine a location of the mobile railway asset by utilizing GNSS data obtained during the second time period and having accuracy equal to or greater than a predetermined threshold.

10. The apparatus of claim 1 wherein the controller is configured to determine an accuracy of the GNSS data, the controller further configured to set a duration of the second time period based at least in part on the accuracy of the GNSS data received during the second time period.

11. The apparatus of claim 1 further comprising a housing configured to be mounted on a mobile railway asset and the limited power source, GNSS circuitry, and controller are in the housing.

12. The apparatus of claim 1 wherein the limited power source includes at least one of:
one or more batteries;
one or more supercapacitors;
a solar panel;
a vibration energy harvesting device; and
a temperature difference energy harvesting device.

13. An apparatus for locating a mobile railway asset, the apparatus comprising:
a limited power source;
global navigation satellite system (GNSS) circuitry configured to utilize electrical power from the limited power source to receive GNSS data from satellites of a GNSS;
a controller operatively coupled to the limited power source and the GNSS circuitry, wherein the controller has:
a power saving mode wherein the controller inhibits the GNSS circuitry from receiving GNSS data;
a standard accuracy mode wherein the controller permits the GNSS circuitry to receive GNSS data for a first time period; and
a higher accuracy mode wherein the controller permits the GNSS circuitry to receive GNSS data for a second time period longer than the first time period;
the controller configured to enter the higher accuracy mode and permit the GNSS circuitry to receive GNSS data for the second time period in response to a determination of a mobile railway asset event;
communication circuitry operatively coupled to the controller and configured to communicate data indicative of a location of the mobile railway asset based at least in part on the GNSS data received during the second time period;

wherein the controller, in the higher accuracy mode thereof, permits the GNSS circuitry to receive a first portion of the GNSS data in a first portion of the second time period and a second portion of the GNSS data in a second portion of the second time period after the first portion; and
the controller is further configured to determine a location of the mobile railway asset utilizing the second portion of the GNSS data but not the first portion of the GNSS data.

14. The apparatus of claim 13 wherein the second portion of the GNSS data of the second period includes a plurality of location readings, the controller configured to determine an accuracy of each of the location readings and determine the location of the mobile railway asset by utilizing location readings having an accuracy higher than a predetermined accuracy.

15. The apparatus of claim 13 wherein the controller is operably coupled to a sensor and the controller is configured to receive data from the sensor and the GNSS circuitry; and
wherein the controller is configured to determine the mobile railway asset event based at least in part on data from at least one of the sensor and the GNSS circuitry.

16. The apparatus of claim 13 further comprising at least one sensor configured to detect at least one parameter of the mobile railway asset; and
the controller is configured to determine the mobile railway asset event in response to a change in the at least one parameter of the mobile railway asset.

17. The apparatus of claim 16 wherein the at least one sensor includes at least one of:
a temperature sensor;
a reed switch;
a pressure transducer;
a strain gauge;
a hall effect sensor;
a temperature sensor;
a limit switch;
an accelerometer;
a piezo-electric sensor;
a microphone;
an inductive-type sensor; and
a load cell.

18. The apparatus of claim 13 wherein the communication circuitry is configured to receive a request for location of the mobile railway asset from an external device; and
wherein the controller makes the determination of the mobile railway asset event upon the communication circuitry receiving the request for the location of the mobile railway asset from the external device.

19. The apparatus of claim 13 wherein the controller is configured to determine a location of the mobile railway asset based at least in part on the GNSS data received during the first time period, the controller further configured to determine the mobile railway asset event in response to the mobile railway asset location being within a predetermined area.

20. The apparatus of claim 13 wherein the communication circuitry is configured to communicate the data indicative of the location of the mobile railway asset to a powered wireless gateway of a locomotive; and
wherein the communication circuitry is configured to wirelessly receive sensor data from a wireless sensor node configured to be mounted on the mobile railway asset.

21. The apparatus of claim 13 wherein the controller is configured to determine the location of the mobile railway asset by utilizing less than all of the GNSS data received during the second time period.

22. The apparatus of claim 13 wherein the controller is configured to determine an accuracy of the GNSS data and the controller is configured to determine a location of the mobile railway asset by utilizing GNSS data obtained during the second time period and having accuracy equal to or greater than a predetermined threshold.

23. The apparatus of claim 13 wherein the controller is configured to determine an accuracy of the GNSS data, the controller further configured to set a duration of the second time period based at least in part on the accuracy of the GNSS data received during the second time period.

24. The apparatus of claim 13 further comprising a housing configured to be mounted on a mobile railway asset and the limited power source, GNSS circuitry, and controller are in the housing.

25. The apparatus of claim 13 wherein the limited power source is a battery.

26. An apparatus for locating a mobile railway asset, the apparatus comprising:
a limited power source;
global navigation satellite system (GNSS) circuitry configured to utilize electrical power from the limited power source to receive GNSS data from satellites of a GNSS;
a controller operatively coupled to the limited power source and the GNSS circuitry, wherein the controller has:
a power saving mode wherein the controller inhibits the GNSS circuitry from receiving GNSS data;
a standard accuracy mode wherein the controller permits the GNSS circuitry to receive GNSS data for a first time period; and
a higher accuracy mode wherein the controller permits the GNSS circuitry to receive GNSS data for a second time period longer than the first time period;
the controller configured to enter the higher accuracy mode and permit the GNSS circuitry to receive GNSS data for the second time period in response to a determination of a mobile railway asset event; and
communication circuitry operatively coupled to the controller and configured to communicate data indicative of a location of the mobile railway asset based at least in part on the GNSS data received during the second time period;
wherein the controller is configured to:
sort the GNSS data received during the second time period based on a measure of accuracy to form a sorted array of GNSS data;
discard a portion of the sorted GNSS data to form a final GNSS data; and
calculate the location of the mobile railway asset based on the final GNSS data.

27. The apparatus of claim 26 wherein the controller is operably coupled to a sensor and the controller is configured to receive data from the sensor and the GNSS circuitry; and
wherein the controller is configured to determine the mobile railway asset event based at least in part on data from at least one of the sensor and the GNSS circuitry.

28. The apparatus of claim 26 further comprising at least one sensor configured to detect at least one parameter of the mobile railway asset; and
the controller is configured to determine the mobile railway asset event in response to a change in the at least one parameter of the mobile railway asset.

29. The apparatus of claim 28 wherein the at least one sensor includes at least one of:
a temperature sensor;
a reed switch;
a pressure transducer;
a strain gauge;
a hall effect sensor;
a temperature sensor;
a limit switch;
an accelerometer;
a piezo-electric sensor;
a microphone;
an inductive-type sensor; and
a load cell.

30. The apparatus of claim 26 wherein the communication circuitry is configured to receive a request for location of the mobile railway asset from an external device; and
wherein the controller makes the determination of the mobile railway asset event upon the communication circuitry receiving the request for the location of the mobile railway asset from the external device.

31. The apparatus of claim 26 wherein the controller is configured to determine a location of the mobile railway asset based at least in part on the GNSS data received during the first time period, the controller further configured to determine the mobile railway asset event in response to the mobile railway asset location being within a predetermined area.

32. The apparatus of claim 26 wherein the communication circuitry is configured to communicate the data indicative of the location of the mobile railway asset to a powered wireless gateway of a locomotive; and
wherein the communication circuitry is configured to wirelessly receive sensor data from a wireless sensor node configured to be mounted on the mobile railway asset.

33. The apparatus of claim 26 wherein the controller is configured to determine an accuracy of the GNSS data, the controller further configured to set a duration of the second time period based at least in part on the accuracy of the GNSS data received during the second time period.

34. The apparatus of claim 26 further comprising a housing configured to be mounted on a mobile railway asset and the limited power source, GNSS circuitry, and controller are in the housing.

35. The apparatus of claim 26 wherein the limited power source is a battery.

36. An apparatus for locating a mobile railway asset, the apparatus comprising:
a limited power source;
global navigation satellite system (GNSS) circuitry configured to utilize electrical power from the limited power source to receive GNSS data from satellites of a GNSS;
a controller operatively coupled to the limited power source and the GNSS circuitry, wherein the controller has:
a power saving mode wherein the controller inhibits the GNSS circuitry from receiving GNSS data;
a standard accuracy mode wherein the controller permits the GNSS circuitry to receive GNSS data for a first time period; and
a higher accuracy mode wherein the controller permits the GNSS circuitry to receive GNSS data for a second time period longer than the first time period;
the controller configured to enter the higher accuracy mode and permit the GNSS circuitry to receive GNSS data for the second time period in response to a determination of a mobile railway asset event; and communication circuitry operatively coupled to the controller and configured to communicate data indicative of a location of the mobile railway asset based at least in part on the GNSS data received during the second time period;

wherein the communication circuitry is configured to receive GNSS current location error data from a stationary gateway; and the controller is configured to determine a location of the mobile railway asset based at least in part on the GNSS data received during the first time period and the current location error data from the stationary gateway.

37. An apparatus for locating a mobile railway asset, the apparatus comprising:

a limited power source;

global navigation satellite system (GNSS) circuitry configured to utilize electrical power from the limited power source to receive GNSS data from satellites of a GNSS;

a controller operatively coupled to the limited power source and the GNSS circuitry, wherein the controller has:

a power saving mode wherein the controller inhibits the GNSS circuitry from receiving GNSS data;

a standard accuracy mode wherein the controller permits the GNSS circuitry to receive GNSS data for a first time period; and a higher accuracy mode wherein the controller permits the GNSS circuitry to receive GNSS data for a second time period longer than the first time period;

the controller configured to enter the higher accuracy mode and permit the GNSS circuitry to receive GNSS data for the second time period in response to a determination of a mobile railway asset event; and communication circuitry operatively coupled to the controller and configured to communicate data indicative of a location of the mobile railway asset based at least in part on the GNSS data received during the second time period;

wherein the controller is configured to categorize the accuracy of each of the GNSS data based at least in part on satellite count, horizontal dilution of precision, or a combination thereof; and the controller further configured to determine the location of the railway asset by utilizing GNSS data obtained during the second time period and having accuracy greater than a threshold accuracy.

38. The apparatus of claim 37 wherein the controller is operably coupled to a sensor and the controller is configured to receive data from the sensor and the GNSS circuitry; and wherein the controller is configured to determine the mobile railway asset event based at least in part on data from at least one of the sensor and the GNSS circuitry.

39. The apparatus of claim 37 further comprising at least one sensor configured to detect at least one parameter of the mobile railway asset; and the controller is configured to determine the mobile railway asset event in response to a change in the at least one parameter of the mobile railway asset.

40. The apparatus of claim 39 wherein the at least one sensor includes at least one of:

a temperature sensor;
a reed switch;
a pressure transducer;
a strain gauge;
a hall effect sensor;
a temperature sensor;
a limit switch;
an accelerometer;
a piezo-electric sensor;
a microphone;
an inductive-type sensor; and
a load cell.

41. The apparatus of claim 37 wherein the communication circuitry is configured to receive a request for location of the mobile railway asset from an external device; and wherein the controller makes the determination of the mobile railway asset event upon the communication circuitry receiving the request for the location of the mobile railway asset from the external device.

42. The apparatus of claim 37 wherein the controller is configured to determine a location of the mobile railway asset based at least in part on the GNSS data received during the first time period, the controller further configured to determine the mobile railway asset event in response to the mobile railway asset location being within a predetermined area.

43. The apparatus of claim 37 wherein the communication circuitry is configured to communicate the data indicative of the location of the mobile railway asset to a powered wireless gateway of a locomotive; and wherein the communication circuitry is configured to wirelessly receive sensor data from a wireless sensor node configured to be mounted on the mobile railway asset.

44. The apparatus of claim 37 wherein the controller is configured to determine an accuracy of the GNSS data, the controller further configured to set a duration of the second time period based at least in part on the accuracy of the GNSS data received during the second time period.

45. The apparatus of claim 37 further comprising a housing configured to be mounted on a mobile railway asset and the limited power source, GNSS circuitry, and controller are in the housing.

46. The apparatus of claim 37 wherein the limited power source is a battery.

47. A system comprising:

a mobile railway asset;

a limited power source;

global navigation satellite system (GNSS) circuitry configured to utilize electrical power from the limited power source to receive GNSS data from satellites of a GNSS;

a controller operatively coupled to the limited power source and the GNSS circuitry, the controller having:

a power saving mode wherein the controller inhibits the GNSS circuitry from receiving GNSS data;

a standard accuracy mode wherein the controller permits the GNSS circuitry to receive GNSS data for a first time period; and a higher accuracy mode wherein the controller permits the GNSS circuitry to receive GNSS data for a second time period longer than the first time period;

the controller configured to enter the higher accuracy mode and permit the GNSS circuitry to receive GNSS data for the second time period in response to a determination of a mobile railway asset event;

communication circuitry operatively coupled to the controller; and the controller configured to, in response to the determination of the mobile railway asset event, control the communication circuitry to communicate to a remote computing device data indicative of a location of the mobile railway asset based at least in part on the GNSS data received during the second time period of the higher accuracy mode.

48. The system of claim 47 further comprising at least one sensor, the controller configured to receive data from the sensor and the GNSS circuitry; and
wherein the controller is configured to make the determination of the mobile railway asset event based on data from the at least one sensor and the GNSS circuitry.

49. The system of claim 47 further comprising at least one sensor configured to detect at least one parameter of the mobile railway asset; and
the controller is configured to determine the mobile railway asset event in response to a change in the at least one parameter of the mobile railway asset.

50. The system of claim 49 wherein the at least one sensor includes at least one of:
a temperature sensor;
a reed switch;
a pressure transducer;
a strain gauge;
a hall effect sensor;
a temperature sensor;
a limit switch;
an accelerometer;
a piezo-electric sensor;
a microphone;
an inductive-type sensor; and
a load cell.

51. The system of claim 47 wherein the communication circuitry is configured to receive a request for location of the mobile railway asset from an external device; and
wherein the controller makes the determination of the mobile railway asset event upon the communication circuitry receiving the request for the location of the mobile railway asset from the external device.

52. The system of claim 47 wherein the system comprises a communication management unit including the limited power source, GNSS circuitry, controller, the communication circuitry;
the system further comprising a powered wireless gateway and at least one wireless sensor node; and
wherein the communication circuitry is configured to wirelessly receive sensor data from the at least one sensor node and communicate the data indicative of the location of the mobile railway asset to the remote computing device via the powered wireless gateway.

53. The system of claim 47 wherein the controller is configured to determine a location of the mobile railway asset by utilizing less than all of the GNSS data received during the second time period.

54. The system of claim 47 wherein the controller is configured to determine an accuracy of the GNSS data and the controller is configured to determine the location of the mobile railway asset by utilizing GNSS data obtained during the second time period having an accuracy greater than a threshold accuracy.

55. The system of claim 47 wherein the controller is configured to categorize the accuracy of the GNSS data, the controller further configured to set a duration of the second time period based at least in part on the categorized accuracy of the GNSS data received during the second time period.

56. The system of claim 47 wherein the mobile railway asset includes a railcar and the limited power source includes a battery.

57. A system comprising:
a mobile railway asset;
a limited power source;
global navigation satellite system (GNSS) circuitry configured to utilize electrical power from the limited power source to receive GNSS data from satellites of a GNSS;
a controller operatively coupled to the limited power source and the GNSS circuitry, the controller having:
a power saving mode wherein the controller inhibits the GNSS circuitry from receiving GNSS data;
a standard accuracy mode wherein the controller permits the GNSS circuitry to receive GNSS data for a first time period; and
a higher accuracy mode wherein the controller permits the GNSS circuitry to receive GNSS data for a second time period longer than the first time period;
the controller configured to enter the higher accuracy mode and permit the GNSS circuitry to receive GNSS data for the second time period in response to a determination of a mobile railway asset event; and
communication circuitry operatively coupled to the controller and configured to communicate data indicative of a location of the mobile railway asset based at least in part on the GNSS data received during the second time period;
wherein the controller, in the higher accuracy mode thereof, permits the GNSS circuitry to receive a first portion of the GNSS data in a first portion of the second time period and a second portion of the GNSS data in a second portion of the second time period after the first portion;
the controller further configured to determine a location of the mobile railway asset utilizing the second portion of the GNSS data but not the first portion of the GNSS data.

58. The system of claim 57 wherein the controller is configured to categorize the accuracy of the GNSS data based at least in part on satellite count, horizontal dilution of precision, or a combination thereof; and
the controller further configured to determine the location of the mobile railway asset by utilizing GNSS data obtained during the second time period and having accuracy greater than a threshold accuracy.

59. A system comprising:
a mobile railway asset;
a limited power source;
global navigation satellite system (GNSS) circuitry configured to utilize electrical power from the limited power source to receive GNSS data from satellites of a GNSS;
a controller operatively coupled to the limited power source and the GNSS circuitry, the controller having:
a power saving mode wherein the controller inhibits the GNSS circuitry from receiving GNSS data;
a standard accuracy mode wherein the controller permits the GNSS circuitry to receive GNSS data for a first time period; and
a higher accuracy mode wherein the controller permits the GNSS circuitry to receive GNSS data for a second time period longer than the first time period;
the controller configured to enter the higher accuracy mode and permit the GNSS circuitry to receive GNSS data for the second time period in response to a determination of a mobile railway asset event; and
communication circuitry operatively coupled to the controller and configured to communicate data indicative of a location of the mobile wherein the controller is configured to:
sort the GNSS data received during the second time period based on corresponding quality metrics to form a sorted GNSS data;
discard a portion of the sorted GNSS data to form a final GNSS data; and
calculate the location of the mobile railway asset based on the final GNSS data.

60. A system comprising:

a mobile railway asset;

a limited power source;

global navigation satellite system (GNSS) circuitry configured to utilize electrical power from the limited power source to receive GNSS data from satellites of a GNSS;

a controller operatively coupled to the limited power source and the GNSS circuitry, the controller having:
a power saving mode wherein the controller inhibits the GNSS circuitry from receiving GNSS data;
a standard accuracy mode wherein the controller permits the GNSS circuitry to receive GNSS data for a first time period; and
a higher accuracy mode wherein the controller permits the GNSS circuitry to receive GNSS data for a second time period longer than the first time period;
the controller configured to enter the higher accuracy mode and permit the GNSS circuitry to receive GNSS data for the second time period in response to a determination of a mobile railway asset event; and
communication circuitry operatively coupled to the controller and configured to communicate data indicative of a location of the mobile
wherein the communication circuitry is configured to receive GNSS current location error data from a stationary gateway; and
the controller is configured to determine a location of the mobile railway asset based at least in part on the GNSS data received during the first time period and the current location error data from the stationary gateway.

* * * * *